(12) United States Patent
Kuimelis et al.

(10) Patent No.: US 11,334,548 B2
(45) Date of Patent: May 17, 2022

(54) INDEX SHARDING

(71) Applicant: ThoughtSpot, Inc., Sunnyvale, CA (US)

(72) Inventors: Peter Kuimelis, Palo Alto, CA (US);
Naresh Kumar, Sunnyvale, CA (US);
Satyam Shekhar, San Jose, CA (US);
Amit Prakash, Saratoga, CA (US);
Abhishek Rai, Mountain View, CA (US)

(73) Assignee: ThoughtSpot, Inc., San Jose, CA (US)

( * ) Notice: Subject to any disclaimer, the term of this patent is extended or adjusted under 35 U.S.C. 154(b) by 189 days.

(21) Appl. No.: 16/556,719

(22) Filed: Aug. 30, 2019

(65) Prior Publication Data

US 2020/0250163 A1 Aug. 6, 2020

Related U.S. Application Data

(60) Provisional application No. 62/799,627, filed on Jan. 31, 2019.

(51) Int. Cl.
*G06F 16/22* (2019.01)
*G06F 16/27* (2019.01)

(52) U.S. Cl.
CPC ...... *G06F 16/2272* (2019.01); *G06F 16/2255* (2019.01); *G06F 16/278* (2019.01)

(58) Field of Classification Search
CPC . G06F 16/2255; G06F 16/2272; G06F 16/278
See application file for complete search history.

(56) References Cited

U.S. PATENT DOCUMENTS

| 5,960,194 A | * | 9/1999 | Choy | ............ G06F 16/278 |
| 6,665,684 B2 | * | 12/2003 | Zait | ............ G06F 16/2264 |
| 8,577,913 B1 | | 11/2013 | Hansson et al. | |

(Continued)

FOREIGN PATENT DOCUMENTS

| EP | 268367 A2 | 5/1988 |
| EP | 1587011 A1 | 10/2005 |

(Continued)

OTHER PUBLICATIONS

Sayyadian et al., "Efficient Keyword Search Across Heterogeneous Relational Databases", 2007, IEEE, 346-355 (10 pp).

(Continued)

*Primary Examiner* — James E Richardson
(74) *Attorney, Agent, or Firm* — Young Basile Hanlon & MacFarlane, P.C.

(57) ABSTRACT

Index sharding in a low-latency database analysis system includes obtaining index configuration data for indexing constituent data, the constituent data including a plurality of logical tables, and indexing, by an indexing unit, the constituent data by partitioning the constituent data based on a characteristic of the constituent data into at least a first partition and a second partition, segmenting the first partition into a first segment of the first partition, sharding the first segment into a first shard of the first segment of the first partition, segmenting, using hash-partitioning, the second partition into one or more segments of the second partition, and for each segment of the second partition, sharding the segment into one or more respective shards.

17 Claims, 10 Drawing Sheets

(56) References Cited

U.S. PATENT DOCUMENTS

| | | | |
|---|---|---|---|
| 9,275,132 | B2 | 3/2016 | Roberts et al. |
| 9,405,794 | B2 | 8/2016 | Prakash et al. |
| 10,108,690 | B1* | 10/2018 | Murray .............. G06F 16/278 |
| 2004/0267730 | A1 | 12/2004 | Dumais et al. |
| 2005/0027717 | A1 | 2/2005 | Koudas et al. |
| 2005/0289124 | A1 | 12/2005 | Kaiser et al. |
| 2007/0192300 | A1 | 8/2007 | Reuther et al. |
| 2007/0219974 | A1 | 9/2007 | Chickering et al. |
| 2008/0109422 | A1 | 5/2008 | Dedhia |
| 2009/0019019 | A1 | 1/2009 | Jones et al. |
| 2009/0019022 | A1 | 1/2009 | Schallert et al. |
| 2011/0113048 | A1 | 5/2011 | Njemanze |
| 2011/0213775 | A1* | 9/2011 | Franke .............. G06F 16/278 707/737 |
| 2012/0066217 | A1 | 3/2012 | Eder |
| 2013/0159659 | A1* | 6/2013 | Gelman .............. G06F 16/278 711/173 |
| 2013/0339370 | A1 | 12/2013 | Holstege et al. |
| 2014/0201241 | A1 | 7/2014 | Wood et al. |
| 2014/0337371 | A1 | 11/2014 | Li |
| 2015/0339369 | A1* | 11/2015 | Rais-Ghasem ....... G06F 16/282 707/739 |
| 2016/0026667 | A1* | 1/2016 | Mukherjee ............ G06F 16/278 707/714 |
| 2017/0270159 | A1 | 9/2017 | Wang et al. |
| 2020/0004449 | A1* | 1/2020 | Rath ................. G06F 3/067 |

FOREIGN PATENT DOCUMENTS

| | | |
|---|---|---|
| EP | 2202658 A2 | 6/2010 |
| EP | 2207106 A2 | 7/2010 |
| WO | 0141002 A1 | 6/2001 |
| WO | 2015009353 A1 | 1/2015 |

OTHER PUBLICATIONS

Wu et al: "Towards Keyword-Driven Analytical Processing", Proceedings of the 2007 ACM Sigmod International Conference on Management of Data, Sigmo '07, Jun. 12, 2007, (12 pp.).

Anonymous: "File System Permission—Wikipedia, The Free Encyclopedia." Jun. 11, 2013 (Jun. 11, 2013); URL: http://en.wikipedia.org/w/index/php?title.sub.-File.sub.-system.sub-p- ermissions&oldid=559455322 [retrieved on May 11, 2014]; (8 pp.).

Shi et al.: "50x Faster: Speeding Up An SQL-Based Legacy System With Few Changes", Oct. 4, 2011 Retrieved from Internet: URL: http://www.user.tu-berline.de/komm/CD/paper/040221.pdf [retrieved on Jun. 11, 2014]. (12 pp.).

Li et al: "Efficient Type-Ahead Search on Relational Data: a Tastier Approach", Sigmod-Pods '09: Compilation Proceedings of the International Conference on Management Data & 28th Symposium on Principles of Database Systems; Providence, RI,USA, Association for Computing Machines, New York NY Jun. 29, 2009, pp. 695-706 (12 pp.).

Blunschi et al: "SODA: Generating SQL for Business Users", Proceedings of the VLDB Endowment, vol. 5, No. 10, Aug. 27, 2012 pp. 932-935 (12 pp.).

Baid et al: "Toward Scalable Keyword Search over Relational Data", Proceedings of the VLDS Endowment, vol. 3, No. 1-2, Sep. 1, 2010, pp. 140-149 (10 pp.).

Jajodia et al., "Flexible Support for Multiple Access Conlrol Policies", ACM Transactions on Database Systems, ACM New York, NY, USA, vol. 26, No. 2, Jun. 1, 2001, pp. 217-228 (48 pp).

Anonymous, "Natural Language Processing", Wikipedia, Downloaded Jan. 30, 2019, https://en.wikipedia.org/wiki/Natural_language_processing, (8 pp).

Seif, G., "An Easy Introduction to Natural Language Processing—Using Computers to Understand Human Language", Oct. 1, 2018 (Downloaded Jan. 30, 2019), https://towardsdatascience.com/an-easy-introduction-to-natural-language-processing-b1e2801291c1, (11 pp).

Extended European Search Report received in co-pending Application No. EP 19160657.3 dated Apr. 4, 2019 (11 pp).

International Search Report and Written Opinion for PCT/US14/39230; dated Nov. 24, 2014 (16 pp).

Avrach, A., thoughtspot.com, "What the Bleep is a Chasm Trap?", https://www.thoughtspot.com/fact-and-dimension/what-bleep-chasm-trap 9/, Date Unknown, Downloaded Apr. 2, 2019 (9 pp).

Sisense, "Chasm and Fan Traps", https://documentation.sisense.com/latest/managing-data/working-with-data/chasm-fan-traps.htm, Date Unknown, Downloaded Apr. 2, 2019 (8 pp).

Thoughtspot, "Chasm Traps", https://docs.thoughtspot.com/4.4/admin/loading/chasm-trap.html, Version 4.4 Guides, Date Unknown, Downloaded Apr. 2, 2019 (4 pp).

Morton, K., et al., "Dynamic Workload Driven Data Integration In Tableau", Proceedings of the 2012 International Conference on Management of Data, SIGMOD '12, Jan. 1, 2012, p. 807 (9 pp).

Extended European Search Report dated Jul. 26, 2019, issued in co-pending EP Application No. 19166422.6 (11 pp).

Eades, Peter, et al., "A Fast & Effective Heuristic for the Feedback Arc Set Problem," Information Processing Letters, vol. 47, Issue 6, Oct. 18, 1993, pp. 319-323.

Wikipedia, "Dijkstra's algorithm", Date Unknown, downloaded Jul. 16, 2019, https://en.wikipedia.org/wiki/Dijkstra%27s_algorithm (11 pp).

Wikipedia, "Consistent hashing", https://en.wikipedia.org/wiki/Consistent_hashing, Date Unknown, Downloaded Aug. 15, 2019, (5 pp).

* cited by examiner

INDEX SHARDING

CROSS-REFERENCE TO RELATED APPLICATION(S)

This application claims priority to and the benefit of U.S. Provisional Application Patent Ser. No. 62/799,627, filed Jan. 31, 2019, the entire disclosure of which is hereby incorporated by reference.

BACKGROUND

Advances in computer storage and database technology have led to exponential growth of the amount of data being created. Businesses are overwhelmed by the volume of the data stored in their computer systems. Existing database analytic tools are inefficient, costly to utilize, and/or require substantial configuration and training.

SUMMARY

Disclosed herein are implementations of index sharding in a low-latency database analysis system.

An aspect of the disclosure is a method of index sharding in a low-latency database analysis system. Index sharding in a low-latency database analysis system may include obtaining constituent data indexing the constituent data. Indexing the constituent data may include, in response to a determination that a previously generated index portion representing the constituent data is unavailable in a primary index, generating an index portion representing the constituent data in an auxiliary index. Generating the index portion representing the constituent data in the auxiliary index may include partitioning the constituent data based on a characteristic of the constituent data into at least a first partition and a second partition, segmenting the first partition into a first segment of the first partition, sharding the first segment into a first shard of the first segment of the first partition, segmenting, using hash-partitioning, the second partition into one or more segments of the second partition, and, for each segment of the second partition, sharding the segment into one or more respective shards. Indexing the constituent data may include, in response to a determination that the previously generated index representing the constituent data is available in the primary index, indexing the constituent data in the primary index. Indexing the constituent data in the primary index may include partitioning the constituent data based on the characteristic of the constituent data into at least a first partition and a second partition, segmenting the first partition into a first segment of the first partition, sharding the first segment into a first shard of the first segment of the first partition, segmenting, using hash-partitioning, the second partition into one or more segments of the second partition, and, for each segment of the second partition, sharding the segment into one or more respective shards. Indexing the constituent data may include, in response to a defined event, compacting the auxiliary index into the primary index.

Another aspect of the disclosure is a method of index sharding in a low-latency database analysis system. Index sharding in a low-latency database analysis system may include obtaining index configuration data for indexing constituent data, the constituent data including a plurality of logical tables and indexing, by an indexing unit, the constituent data. Indexing the constituent data may include partitioning the constituent data based on a characteristic of the constituent data into at least a first partition and a second partition, segmenting the first partition into a first segment of the first partition, sharding the first segment into a first shard of the first segment of the first partition, segmenting, using hash-partitioning, the second partition into one or more segments of the second partition, and, for each segment of the second partition, sharding the segment into one or more respective shards. Index sharding in a low-latency database analysis system may include receiving data expressing a usage intent with respect to the constituent data, in response to receiving the data expressing the usage intent, generating response data responsive to the data expressing the usage intent, wherein generating the response data includes resolving at least a portion of the data expressing the usage intent by traversing the index, wherein traversing the unified index includes traversing a shard from the index to identify a token corresponding to a portion of the data expressing the usage intent, and outputting the response data.

Another aspect of the disclosure is a low-latency database analysis system. The low-latency database analysis system includes a system access interface unit and an indexing unit. The system access interface unit is operable to generate data expressing a usage intent with respect to a defined set of constituent data. The indexing unit is operable to index the constituent data by partitioning the constituent data based on a characteristic of the constituent data into at least a first partition and a second partition, segmenting the first partition into a first segment of the first partition, sharding the first segment into a first shard of the first segment of the first partition, segmenting, using hash-partitioning, the second partition into one or more segments of the second partition, and, for each segment of the second partition, sharding the segment into one or more respective shards. The indexing unit is operable to output, to the system access interface unit, response data responsive to the data expressing the usage intent by, in response to receiving the data expressing the usage intent, generating the response data, wherein generating the response data includes resolving at least a portion of the data expressing the usage intent by traversing the index, wherein traversing the unified index includes traversing a shard from the index to identify a token corresponding to a portion of the data expressing the usage intent.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features may be arbitrarily expanded or reduced for clarity.

DETAILED DESCRIPTION

Figure 1:
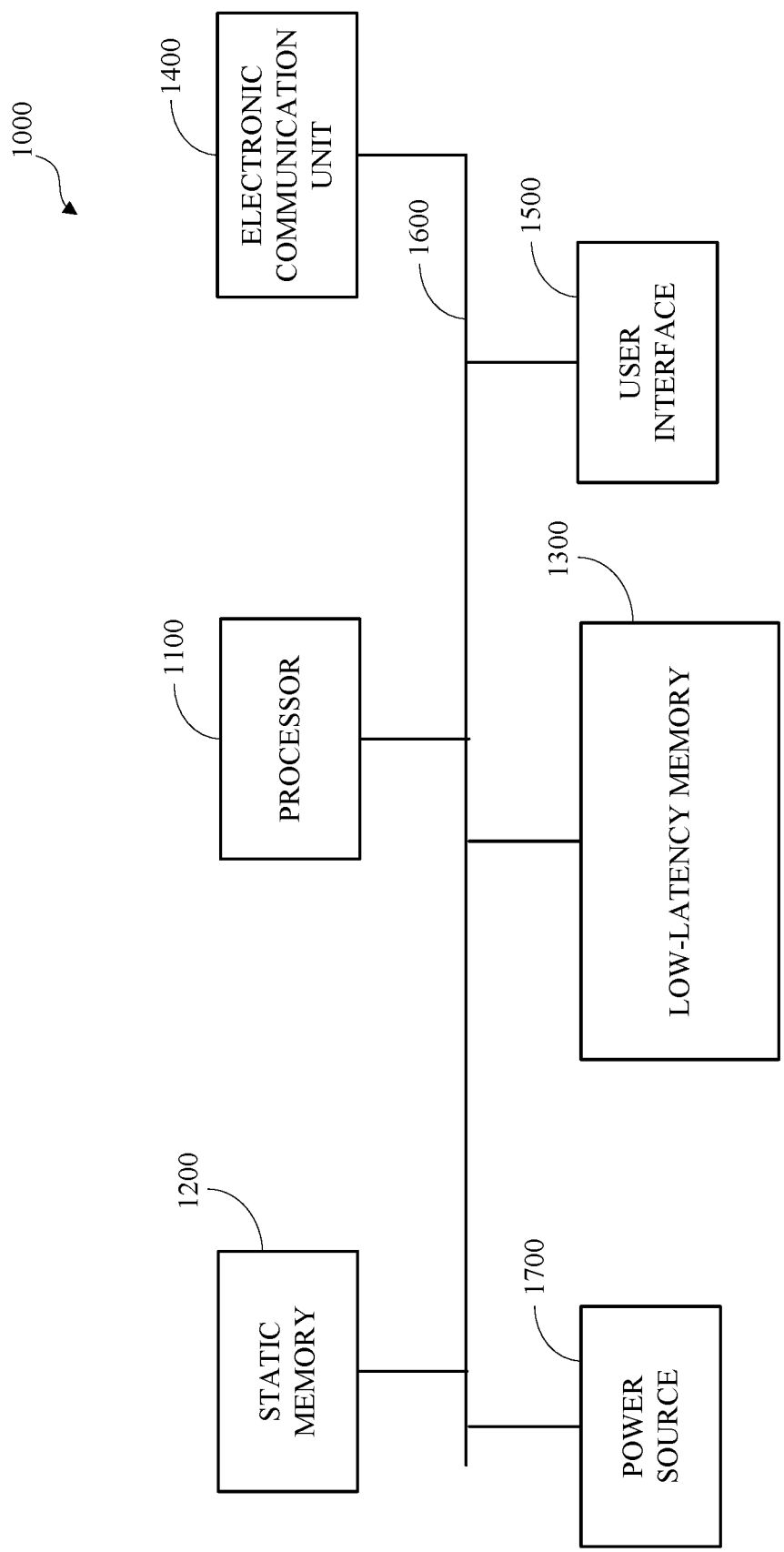
FIG. 1 is a block diagram of an example of a computing device.

Businesses and other organizations store large amounts of data, such as business records, transaction records, and the like, in data storage systems, such as relational database systems that store data as records, or rows, having values, or fields, corresponding to respective columns in tables that can be interrelated using key values. Databases structures are often normalized or otherwise organized to maximize data density and to maximize transactional data operations at the expense of increased complexity and reduced accessibility for analysis. Individual records and tables may have little or no utility without substantial correlation, interpretation, and analysis. The complexity of these data structures and the large volumes of data that can be stored therein limit the accessibility of the data and require substantial skilled human resources to code procedures and tools that allow business users to access useful data. The tools that are available for accessing these systems are limited to outputting data expressly requested by the users and lack the capability to identify and prioritize data other than the data expressly requested. Useful data, such as data aggregations, patterns, and statistical anomalies that would not be available in smaller data sets (e.g., 10,000 rows of data), and may not be apparent to human users, may be derivable using the large volume of data (e.g., millions or billions of rows) stored in complex data storage systems, such as relational database systems, but may be inaccessible due to the complexity and limitations of the data storage systems.

A low-latency database analysis system may improve efficiency and utility relative to other database and data analysis systems. For example, the low-latency database analysis system described herein may include one or more indexes, which may be distinct from a database of the low-latency database analysis system, which may improve the efficiency, responsiveness, and accuracy of data access by storing data in a low-latency index data structure and searching for data efficiently using the indexes. Indexing, such as indexing in other database and data analysis systems, which may include using monolithic indexes, may utilize significant resources, such as processing and memory resources, for building, updating (or rebuilding), and searching the indexes, which may reduce the efficiency, robustness (e.g., fault tolerance), and responsiveness of such systems.

The index sharding in the low-latency database analysis system described herein includes partitioning data for indexing that increases incrementality of updates to a unified distributed search index comprised of data from multiple sources, relative to indexing unpartitioned (or monolithic) data or indexing of data otherwise partitioned, which improves the efficiency, robustness (e.g., fault tolerance), and responsiveness of the low-latency database analysis system. Robustness and fault tolerance are improved by distributing one or more of the indexes in a clustered or distributed computing configuration. Efficiency and responsiveness are improved by reducing the resource requirements for building and updating (or rebuilding) one or more of the indexes by building or updating the indexes in a resource balanced clustered or distributed computing configuration as described herein.

FIG. 1 is a block diagram of an example of a computing device 1000. One or more aspects of this disclosure may be implemented using the computing device 1000. The computing device 1000 includes a processor 1100, static memory 1200, low-latency memory 1300, an electronic communication unit 1400, a user interface 1500, a bus 1600, and a power source 1700. Although shown as a single unit, any one or more element of the computing device 1000 may be integrated into any number of separate physical units. For example, the low-latency memory 1300 and the processor 1100 may be integrated in a first physical unit and the user interface 1500 may be integrated in a second physical unit. Although not shown in FIG. 1, the computing device 1000 may include other aspects, such as an enclosure or one or more sensors.

The computing device 1000 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC.

The processor 1100 may include any device or combination of devices capable of manipulating or processing a signal or other information, including optical processors, quantum processors, molecular processors, or a combination thereof. The processor 1100 may be a central processing unit (CPU), such as a microprocessor, and may include one or more processing units, which may respectively include one or more processing cores. The processor 1100 may include multiple interconnected processors. For example, the multiple processors may be hardwired or networked, including wirelessly networked. In some implementations, the operations of the processor 1100 may be distributed across multiple physical devices or units that may be coupled directly or across a network. In some implementations, the processor 1100 may include a cache, or cache memory, for internal storage of operating data or instructions. The processor 1100 may include one or more special purpose processors, one or more digital signal processor (DSP), one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, firmware, one or more state machines, or any combination thereof.

The processor 1100 may be operatively coupled with the static memory 1200, the low-latency memory 1300, the electronic communication unit 1400, the user interface 1500, the bus 1600, the power source 1700, or any combination thereof. The processor may execute, which may include controlling, such as by sending electronic signals to, receiving electronic signals from, or both, the static memory 1200, the low-latency memory 1300, the electronic communication unit 1400, the user interface 1500, the bus 1600, the power source 1700, or any combination thereof to execute, instructions, programs, code, applications, or the like, which may include executing one or more aspects of an operating system, and which may include executing one or more instructions to perform one or more aspects described herein, alone or in combination with one or more other processors.

The static memory 1200 is coupled to the processor 1100 via the bus 1600 and may include non-volatile memory, such as a disk drive, or any form of non-volatile memory capable of persistent electronic information storage, such as in the absence of an active power supply. Although shown as a single block in FIG. 1, the static memory 1200 may be implemented as multiple logical or physical units.

The static memory 1200 may store executable instructions or data, such as application data, an operating system, or a combination thereof, for access by the processor 1100. The executable instructions may be organized into programmable modules or algorithms, functional programs, codes, code segments, or combinations thereof to perform one or more aspects, features, or elements described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer.

The low-latency memory 1300 is coupled to the processor 1100 via the bus 1600 and may include any storage medium with low-latency data access including, for example, DRAM modules such as DDR SDRAM, Phase-Change Memory (PCM), flash memory, or a solid-state drive. Although shown as a single block in FIG. 1, the low-latency memory 1300 may be implemented as multiple logical or physical units. Other configurations may be used. For example, low-latency memory 1300, or a portion thereof, and processor 1100 may be combined, such as by using a system on a chip design.

The low-latency memory 1300 may store executable instructions or data, such as application data for low-latency access by the processor 1100. The executable instructions may include, for example, one or more application programs, that may be executed by the processor 1100. The executable instructions may be organized into programmable modules or algorithms, functional programs, codes, code segments, and/or combinations thereof to perform various functions described herein.

The low-latency memory 1300 may be used to store data that is analyzed or processed using the systems or methods described herein. For example, storage of some or all data in low-latency memory 1300 instead of static memory 1200 may improve the execution speed of the systems and methods described herein by permitting access to data more quickly by an order of magnitude or greater (e.g., nanoseconds instead of microseconds).

The electronic communication unit 1400 is coupled to the processor 1100 via the bus 1600. The electronic communication unit 1400 may include one or more transceivers. The electronic communication unit 1400 may, for example, provide a connection or link to a network via a network interface. The network interface may be a wired network interface, such as Ethernet, or a wireless network interface. For example, the computing device 1000 may communicate with other devices via the electronic communication unit 1400 and the network interface using one or more network protocols, such as Ethernet, Transmission Control Protocol/Internet Protocol (TCP/IP), power line communication (PLC), Wi-Fi, infrared, ultra violet (UV), visible light, fiber optic, wire line, general packet radio service (GPRS), Global System for Mobile communications (GSM), code-division multiple access (CDMA), Long-Term Evolution (LTE), or other suitable protocols.

The user interface 1500 may include any unit capable of interfacing with a human user, such as a virtual or physical keypad, a touchpad, a display, a touch display, a speaker, a microphone, a video camera, a sensor, a printer, or any combination thereof. For example, a keypad can convert physical input of force applied to a key to an electrical signal that can be interpreted by computing device 1000. In another example, a display can convert electrical signals output by computing device 1000 to light. The purpose of such devices may be to permit interaction with a human user, for example by accepting input from the human user and providing output back to the human user. The user interface 1500 may include a display; a positional input device, such as a mouse, touchpad, touchscreen, or the like; a keyboard; or any other human and machine interface device. The user interface 1500 may be coupled to the processor 1100 via the bus 1600. In some implementations, the user interface 1500 can include a display, which can be a liquid crystal display (LCD), a cathode-ray tube (CRT), a light emitting diode (LED) display, an organic light emitting diode (OLED) display, an active matrix organic light emitting diode (AMOLED), or other suitable display. In some implementations, the user interface 1500, or a portion thereof, may be part of another computing device (not shown). For example, a physical user interface, or a portion thereof, may be omitted from the computing device 1000 and a remote or virtual interface may be used, such as via the electronic communication unit 1400.

The bus 1600 is coupled to the static memory 1200, the low-latency memory 1300, the electronic communication unit 1400, the user interface 1500, and the power source 1700. Although a single bus is shown in FIG. 1, the bus 1600 may include multiple buses, which may be connected, such as via bridges, controllers, or adapters.

The power source 1700 provides energy to operate the computing device 1000. The power source 1700 may be a general-purpose alternating-current (AC) electric power supply, or power supply interface, such as an interface to a household power source. In some implementations, the power source 1700 may be a single use battery or a rechargeable battery to allow the computing device 1000 to operate independently of an external power distribution system. For example, the power source 1700 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device capable of powering the computing device 1000.

Figure 2:
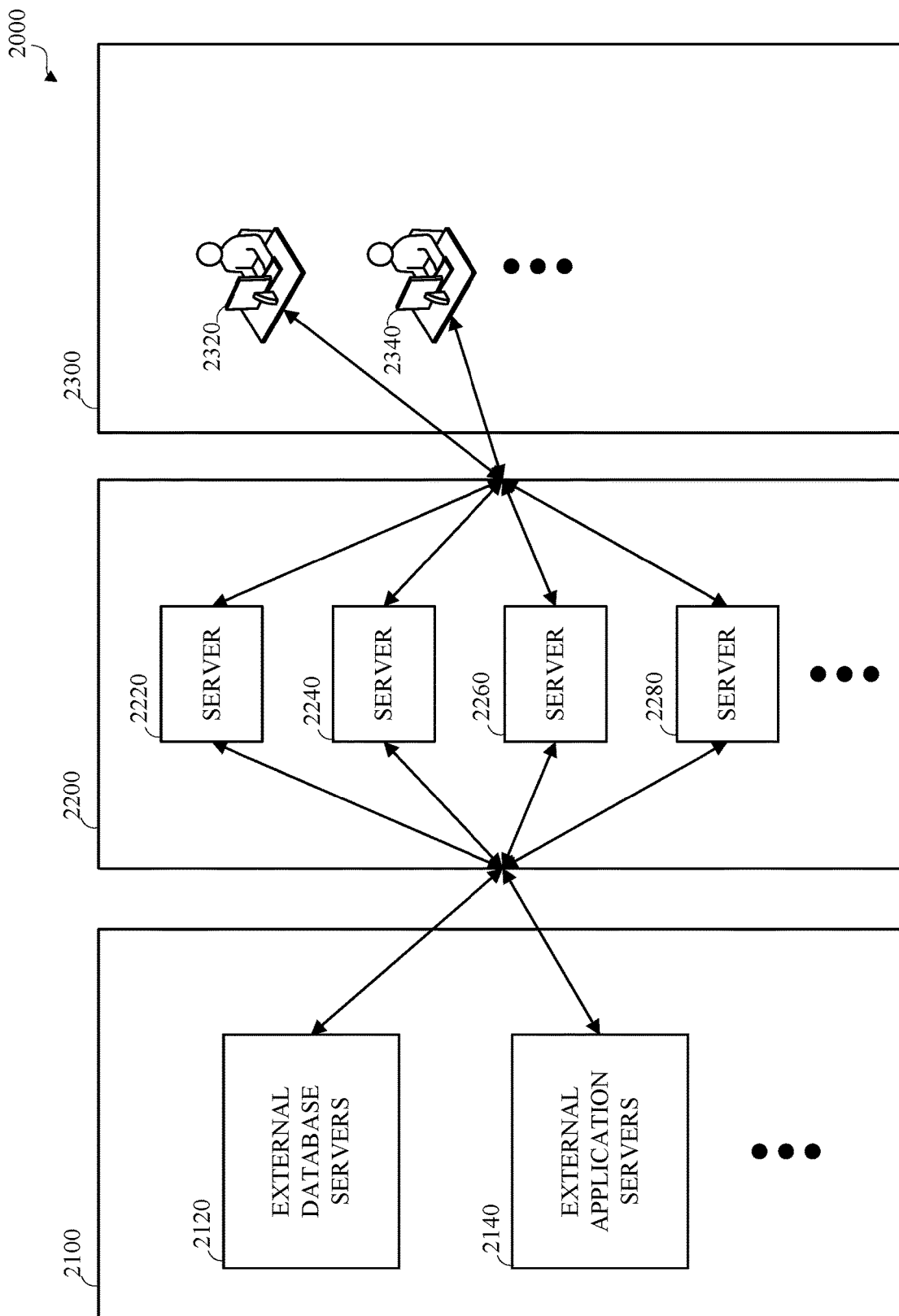
FIG. 2 is a block diagram of an example of a computing system.

FIG. 2 is a block diagram of an example of a computing system 2000. As shown, the computing system 2000 includes an external data source portion 2100, an internal database analysis portion 2200, and a system interface portion 2300. The computing system 2000 may include other elements not shown in FIG. 2, such as computer network elements.

The external data source portion 2100 may be associated with, such as controlled by, an external person, entity, or organization (second-party). The internal database analysis portion 2200 may be associated with, such as created by or controlled by, a person, entity, or organization (first-party). The system interface portion 2300 may be associated with, such as created by or controlled by, the first-party and may be accessed by the first-party, the second-party, third-parties, or a combination thereof, such as in accordance with access and authorization permissions and procedures.

The external data source portion 2100 is shown as including external database servers 2120 and external application servers 2140. The external data source portion 2100 may include other elements not shown in FIG. 2. The external data source portion 2100 may include external computing devices, such as the computing device 1000 shown in FIG. 1, which may be used by or accessible to the external person, entity, or organization (second-party) associated with the external data source portion 2100, including but not limited to external database servers 2120 and external application servers 2140. The external computing devices may include data regarding the operation of the external person, entity, or organization (second-party) associated with the external data source portion 2100.

The external database servers 2120 may be one or more computing devices configured to store data in a format and schema determined externally from the internal database analysis portion 2200, such as by a second-party associated with the external data source portion 2100, or a third party. For example, the external database server 2120 may use a relational database and may include a database catalog with a schema. In some embodiments, the external database server 2120 may include a non-database data storage structure, such as a text-based data structure, such as a comma separated variable structure or an extensible markup language formatted structure or file. For example, the external database servers 2120 can include data regarding the production of materials by the external person, entity, or organization (second-party) associated with the external data source portion 2100, communications between the external person, entity, or organization (second-party) associated with the external data source portion 2100 and third parties, or a combination thereof. Other data may be included. The external database may be a structured database system, such as a relational database operating in a relational database management system (RDBMS), which may be an enterprise database. In some embodiments, the external database may be an unstructured data source. The external data may include data or content, such as sales data, revenue data, profit data, tax data, shipping data, safety data, sports data, health data, weather data, or the like, or any other data, or combination of data, that may be generated by or associated with a user, an organization, or an enterprise and stored in a database system. For simplicity and clarity, data stored in or received from the external data source portion 2100 may be referred to herein as enterprise data.

The external application server 2140 may include application software, such as application software used by the external person, entity, or organization (second-party) associated with the external data source portion 2100. The external application server 2140 may include data or metadata relating to the application software.

The external database servers 2120, the external application servers 2140, or both, shown in FIG. 2 may represent logical units or devices that may be implemented on one or more physical units or devices, which may be controlled or operated by the first party, the second party, or a third party.

The external data source portion 2100, or aspects thereof, such as the external database servers 2120, the external application servers 2140, or both, may communicate with the internal database analysis portion 2200, or an aspect thereof, such as one or more of the servers 2220, 2240, 2260, and 2280, via an electronic communication medium, which may be a wired or wireless electronic communication medium. For example, the electronic communication medium may include a local area network (LAN), a wide area network (WAN), a fiber channel network, the Internet, or a combination thereof.

The internal database analysis portion 2200 is shown as including servers 2220, 2240, 2260, and 2280. The servers 2220, 2240, 2260, and 2280 may be computing devices, such as the computing device 1000 shown in FIG. 1. Although four servers 2220, 2240, 2260, and 2280 are shown in FIG. 2, other numbers, or cardinalities, of servers may be used. For example, the number of computing devices may be determined based on the capability of individual computing devices, the amount of data to be processed, the complexity of the data to be processed, or a combination thereof. Other metrics may be used for determining the number of computing devices.

The internal database analysis portion 2200 may store data, process data, or store and process data. The internal database analysis portion 2200 may include a distributed cluster (not expressly shown) which may include two or more of the servers 2220, 2240, 2260, and 2280. The operation of distributed cluster, such as the operation of the servers 2220, 2240, 2260, and 2280 individually, in combination, or both, may be managed by a distributed cluster manager. For example, the server 2220 may be the distributed cluster manager. In another example, the distributed cluster manager may be implemented on another computing device (not shown). The data and processing of the distributed cluster may be distributed among the servers 2220, 2240, 2260, and 2280, such as by the distributed cluster manager.

Enterprise data from the external data source portion 2100, such as from the external database server 2120, the external application server 2140, or both may be imported into the internal database analysis portion 2200. The external database server 2120, the external application server 2140, or both may be one or more computing devices and may communicate with the internal database analysis portion 2200 via electronic communication. The imported data may be distributed among, processed by, stored on, or a combination thereof, one or more of the servers 2220, 2240, 2260, and 2280. Importing the enterprise data may include importing or accessing the data structures of the enterprise data. Importing the enterprise data may include generating internal data, internal data structures, or both, based on the enterprise data. The internal data, internal data structures, or both may accurately represent and may differ from the enterprise data, the data structures of the enterprise data, or both. In some implementations, enterprise data from multiple external data sources may be imported into the internal database analysis portion 2200. For simplicity and clarity, data stored or used in the internal database analysis portion 2200 may be referred to herein as internal data. For example, the internal data, or a portion thereof, may represent, and may be distinct from, enterprise data imported into or accessed by the internal database analysis portion 2200.

The system interface portion 2300 may include one or more client devices 2320, 2340. The client devices 2320, 2340 may be computing devices, such as the computing device 1000 shown in FIG. 1. For example, one of the client devices 2320, 2340 may be a desktop or laptop computer and the other of the client devices 2320, 2340 may be a mobile device, smartphone, or tablet. One or more of the client devices 2320, 2340 may access the internal database analysis portion 2200. For example, the internal database analysis portion 2200 may provide one or more services, application interfaces, or other electronic computer communication interfaces, such as a web site, and the client devices 2320, 2340 may access the interfaces provided by the internal database analysis portion 2200, which may include accessing the internal data stored in the internal database analysis portion 2200.

In an example, one or more of the client devices 2320, 2340 may send a message or signal indicating a request for data, which may include a request for data analysis, to the internal database analysis portion 2200. The internal database analysis portion 2200 may receive and process the request, which may include distributing the processing among one or more of the servers 2220, 2240, 2260, and 2280, may generate a response to the request, which may include generating or modifying internal data, internal data structures, or both, and may output the response to the client device 2320, 2340 that sent the request. Processing the request may include accessing one or more internal data indexes, an internal database, or a combination thereof. The client device 2320, 2340 may receive the response, including the response data or a portion thereof, and may store, output, or both, the response or a representation thereof, such as a representation of the response data, or a portion thereof, which may include presenting the representation via a user interface on a presentation device of the client device 2320, 2340, such as to a user of the client device 2320, 2340.

The system interface portion 2300, or aspects thereof, such as one or more of the client devices 2320, 2340, may communicate with the internal database analysis portion 2200, or an aspect thereof, such as one or more of the servers 2220, 2240, 2260, and 2280, via an electronic communication medium, which may be a wired or wireless electronic communication medium. For example, the electronic communication medium may include a local area network (LAN), a wide area network (WAN), a fiber channel network, the Internet, or a combination thereof.

Figure 3:
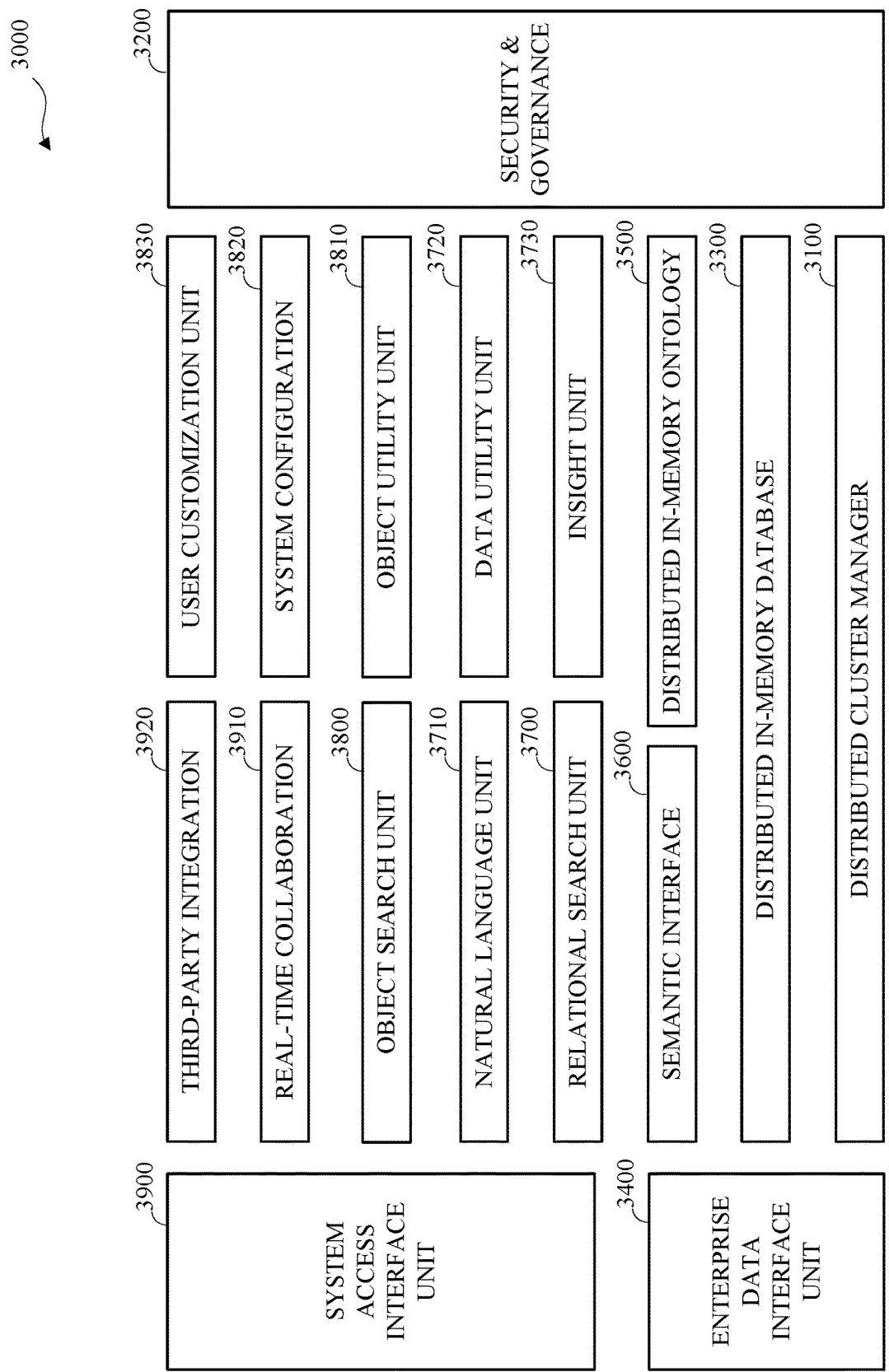
FIG. 3 is a block diagram of an example of a low-latency database analysis system.

FIG. 3 is a block diagram of an example of a low-latency database analysis system 3000. The low-latency database analysis system 3000, or aspects thereof, may be similar to the internal database analysis portion 2200 shown in FIG. 2, except as described herein or otherwise clear from context. The low-latency database analysis system 3000, or aspects thereof, may be implemented on one or more computing devices, such as servers 2220, 2240, 2260, and 2280 shown in FIG. 2, which may be in a clustered or distributed computing configuration.

The low-latency database analysis system 3000 may store and maintain the internal data, or a portion thereof, such as low-latency data, in a low-latency memory device, such as the low-latency memory 1300 shown in FIG. 1, or any other type of data storage medium or combination of data storage devices with relatively fast (low-latency) data access, organized in a low-latency data structure. In some embodiments, the low-latency database analysis system 3000 may be implemented as one or more logical devices in a cloud-based configuration optimized for automatic database analysis.

As shown, the low-latency database analysis system 3000 includes a distributed cluster manager 3100, a security and governance unit 3200, a distributed in-memory database 3300, an enterprise data interface unit 3400, a distributed in-memory ontology unit 3500, a semantic interface unit 3600, a relational search unit 3700, a natural language processing unit 3710, a data utility unit 3720, an insight unit 3730, an object search unit 3800, an object utility unit 3810, a system configuration unit 3820, a user customization unit 3830, a system access interface unit 3900, a real-time collaboration unit 3910, and a third-party integration unit 3920, which may be collectively referred to as the components of the low-latency database analysis system 3000.

Although not expressly shown in FIG. 3, one or more of the components of the low-latency database analysis system 3000 may be implemented on one or more operatively connected physical or logical computing devices, such as in a distributed cluster computing configuration, such as the internal database analysis portion 2200 shown in FIG. 2. Although shown separately in FIG. 3, one or more of the components of the low-latency database analysis system 3000, or respective aspects thereof, may be combined or otherwise organized.

The low-latency database analysis system 3000 may include different, fewer, or additional components not shown in FIG. 3. The aspects or components implemented in an instance of the low-latency database analysis system 3000 may be configurable. For example, the insight unit 3730 may be omitted or disabled. One or more of the components of the low-latency database analysis system 3000 may be implemented in a manner such that aspects thereof are divided or combined into various executable modules or libraries in a manner which may differ from that described herein.

The low-latency database analysis system 3000 may implement an application programming interface (API), which may monitor, receive, or both, input signals or messages from external devices and systems, client systems, process received signals or messages, transmit corresponding signals or messages to one or more of the components of the low-latency database analysis system 3000, and output, such as transmit or send, output messages or signals to respective external devices or systems. The low-latency database analysis system 3000 may be implemented in a distributed computing configuration.

The distributed cluster manager 3100 manages the operative configuration of the low-latency database analysis system 3000. Managing the operative configuration of the low-latency database analysis system 3000 may include controlling the implementation of and distribution of processing and storage across one or more logical devices operating on one or more physical devices, such as the servers 2220, 2240, 2260, and 2280 shown in FIG. 2. The distributed cluster manager 3100 may generate and maintain configuration data for the low-latency database analysis system 3000, such as in one or more tables, identifying the operative configuration of the low-latency database analysis system 3000. For example, the distributed cluster manager 3100 may automatically update the low-latency database analysis system configuration data in response to an operative configuration event, such as a change in availability or performance for a physical or logical unit of the low-latency database analysis system 3000. One or more of the component units of low-latency database analysis system 3000 may access the database analysis system configuration data, such as to identify intercommunication parameters or paths.

The security and governance unit 3200 may describe, implement, enforce, or a combination thereof, rules and procedures for controlling access to aspects of the low-latency database analysis system 3000, such as the internal data of the low-latency database analysis system 3000 and the features and interfaces of the low-latency database analysis system 3000. The security and governance unit 3200 may apply security at an ontological level to control or limit access to the internal data of the low-latency database analysis system 3000, such as to columns, tables, rows, or fields, which may include using row level security.

Although shown as a single unit in FIG. 3, the distributed in-memory database 3300 may be implemented in a distributed configuration, such as distributed among the servers 2220, 2240, 2260, and 2280 shown in FIG. 2, which may include multiple in-memory database instances. Each in-memory database instance may utilize one or more distinct resources, such as processing or low-latency memory resources, that differ from the resources utilized by the other in-memory database instances. In some embodiments, the in-memory database instances may utilize one or more shared resources, such as resources utilized by two or more in-memory database instances.

The distributed in-memory database 3300 may generate, maintain, or both, a low-latency data structure and data stored or maintained therein (low-latency data). The low-latency data may include principal data, which may represent enterprise data, such as enterprise data imported from an external enterprise data source, such as the external data source portion 2100 shown in FIG. 2. In some implementations, the distributed in-memory database 3300 may include system internal data representing one or more aspects, features, or configurations of the low-latency database analysis system 3000. The distributed in-memory database 3300 and the low-latency data stored therein, or a portion thereof, may be accessed using commands, messages, or signals in accordance with a defined structured query language associated with the distributed in-memory database 3300.

The low-latency data, or a portion thereof, may be organized as tables in the distributed in-memory database 3300. A table may be a data structure to organize or group the data or a portion thereof, such as related or similar data. A table may have a defined structure. For example, each table may define or describe a respective set of one or more columns.

A column may define or describe the characteristics of a discrete aspect of the data in the table. For example, the definition or description of a column may include an identifier, such as a name, for the column within the table, and one or more constraints, such as a data type, for the data corresponding to the column in the table. The definition or description of a column may include other information, such as a description of the column. The data in a table may be accessible or partitionable on a per-column basis. The set of tables, including the column definitions therein, and information describing relationships between elements, such as tables and columns, of the database may be defined or described by a database schema or design. The cardinality of columns of a table, and the definition and organization of the columns, may be defined by the database schema or design. Adding, deleting, or modifying a table, a column, the definition thereof, or a relationship or constraint thereon, may be a modification of the database design, schema, model, or structure.

The low-latency data, or a portion thereof, may be stored in the database as one or more rows or records in respective tables. Each record or row of a table may include a respective field or cell corresponding to each column of the table. A field may store a discrete data value. The cardinality of rows of a table, and the values stored therein, may be variable based on the data. Adding, deleting, or modifying rows, or the data stored therein may omit modification of the database design, schema, or structure. The data stored in respective columns may be identified or defined as a measure data, attribute data, or enterprise ontology data (e.g., metadata).

Measure data, or measure values, may include quantifiable or additive numeric values, such as integer or floating-point values, which may include numeric values indicating sizes, amounts, degrees, or the like. A column defined as representing measure values may be referred to herein as a measure or fact. A measure may be a property on which quantitative operations (e.g., sum, count, average, minimum, maximum) may be performed to calculate or determine a result or output.

Attribute data, or attribute values, may include non-quantifiable values, such as text or image data, which may indicate names and descriptions, quantifiable values designated, defined, or identified as attribute data, such as numeric unit identifiers, or a combination thereof. A column defined as including attribute values may be referred to herein as an attribute or dimension. For example, attributes may include text, identifiers, timestamps, or the like.

Enterprise ontology data may include data that defines or describes one or more aspects of the database, such as data that describes one or more aspects of the attributes, measures, rows, columns, tables, relationships, or other aspects of the data or database schema. For example, a portion of the database design, model, or schema may be represented as enterprise ontology data in one or more tables in the database.

Distinctly identifiable data in the low-latency data may be referred to herein as a data portion. For example, the low-latency data stored in the distributed in-memory database 3300 may be referred to herein as a data portion, a table from the low-latency data may be referred to herein as a data portion, a column from the low-latency data may be referred to herein as a data portion, a row or record from the low-latency data may be referred to herein as a data portion, a value from the low-latency data may be referred to herein as a data portion, a relationship defined in the low-latency data may be referred to herein as a data portion, enterprise ontology data describing the low-latency data may be referred to herein as a data portion, or any other distinctly identifiable data, or combination thereof, from the low-latency data may be referred to herein as a data portion.

The distributed in-memory database 3300 may create or add one or more data portions, such as a table, may read from or access one or more data portions, may update or modify one or more data portions, may remove or delete one or more data portions, or a combination thereof. Adding, modifying, or removing data portions may include changes to the data model of the low-latency data. Changing the data model of the low-latency data may include notifying one or more other components of the low-latency database analysis system 3000, such as by sending, or otherwise making available, a message or signal indicating the change. For example, the distributed in-memory database 3300 may create or add a table to the low-latency data and may transmit or send a message or signal indicating the change to the semantic interface unit 3600.

In some implementations, a portion of the low-latency data may represent a data model of an external enterprise database and may omit the data stored in the external enterprise database, or a portion thereof. For example, prioritized data may be cached in the distributed in-memory database 3300 and the other data may be omitted from storage in the distributed in-memory database 3300, which may be stored in the external enterprise database. In some implementations, requesting data from the distributed in-memory database 3300 may include requesting the data, or a portion thereof, from the external enterprise database.

The distributed in-memory database 3300 may receive one or more messages or signals indicating respective data-queries for the low-latency data, or a portion thereof, which may include data-queries for modified, generated, or aggregated data generated based on the low-latency data, or a portion thereof. For example, the distributed in-memory database 3300 may receive a data-query from the semantic interface unit 3600, such as in accordance with a request for data. The data-queries received by the distributed in-memory database 3300 may be agnostic to the distributed configuration of the distributed in-memory database 3300. A data-query, or a portion thereof, may be expressed in accordance with the defined structured query language implemented by the distributed in-memory database 3300. In some implementations, a data-query may be included, such as stored or communicated, in a data-query data structure or container.

The distributed in-memory database 3300 may execute or perform one or more queries to generate or obtain response data responsive to the data-query based on the low-latency data.

The distributed in-memory database 3300 may interpret, evaluate, or otherwise process a data-query to generate one or more distributed-queries, which maybe expressed in accordance with the defined structured query language. For example, the distributed in-memory database 3300 may identify an in-memory database instance as a query coordinator may generate a query plan, which may include generating one or more distributed-queries, based on the received data-query. The query plan may include query execution instructions for executing the received query by the one or more of the in-memory database instances. The query coordinator may distribute, or otherwise make available, the respective portions of the query execution instructions to the corresponding in-memory database instances.

The respective in-memory database instances may receive the corresponding query execution instructions from the query coordinator. The respective in-memory database instances may execute the corresponding query execution instructions to obtain, process, or both, data (intermediate results data) from the low-latency data. The respective in-memory database instances may output, or otherwise make available, the intermediate results data, such as to the query coordinator.

The query coordinator may execute a respective portion of query execution instructions (allocated to the query coordinator) to obtain, process, or both, data (intermediate results data) from the low-latency data. The query coordinator may receive, or otherwise access, the intermediate results data from the respective in-memory database instances. The query coordinator may combine, aggregate, or otherwise process, the intermediate results data to obtain results data.

In some embodiments, obtaining the intermediate results data by one or more of the in-memory database instances may include outputting the intermediate results data to, or obtaining intermediate results data from, one or more other in-memory database instances, in addition to, or instead of, obtaining the intermediate results data from the low-latency data.

The distributed in-memory database 3300 may output, or otherwise make available, the results data to the semantic interface unit 3600.

The enterprise data interface unit 3400 may interface with, or communicate with, an external enterprise data system. For example, the enterprise data interface unit 3400 may receive or access enterprise data from or in an external system, such as an external database. The enterprise data interface unit 3400 may import, evaluate, or otherwise process the enterprise data to populate, create, or modify data stored in the low-latency database analysis system 3000. The enterprise data interface unit 3400 may receive, or otherwise access, the enterprise data from one or more external data sources, such as the external data source portion 2100 shown in FIG. 2, and may represent the enterprise data in the low-latency database analysis system 3000 by importing, loading, or populating the enterprise data as principal data in the distributed in-memory database 3300, such as in one or more low-latency data structures. The enterprise data interface unit 3400 may implement one or more data connectors, which may transfer data between, for example, the external data source and the distributed in-memory database 3300, which may include altering, formatting, evaluating, or manipulating the data.

The enterprise data interface unit 3400 may receive, access, or generate metadata that identifies one or more parameters or relationships for the principal data, such as based on the enterprise data, and may include the generated metadata in the low-latency data stored in the distributed in-memory database 3300. For example, the enterprise data interface unit 3400 may identify characteristics of the principal data such as, attributes, measures, values, unique identifiers, tags, links, keys, or the like, and may include metadata representing the identified characteristics in the low-latency data stored in the distributed in-memory database 3300. The characteristics of the data can be automatically determined by receiving, accessing, processing, evaluating, or interpreting the schema in which the enterprise data is stored, which may include automatically identifying links or relationships between columns, classifying columns (e.g., using column names), and analyzing or evaluating the data.

Distinctly identifiable operative data units or structures representing one or more data portions, one or more entities, users, groups, or organizations represented in the internal data, or one or more aggregations, collections, relations, analytical results, visualizations, or groupings thereof, may be represented in the low-latency database analysis system 3000 as objects. An object may include a unique identifier for the object, such as a fully qualified name. An object may include a name, such as a displayable value, for the object.

For example, an object may represent a user, a group, an entity, an organization, a privilege, a role, a table, a column, a data relationship, a worksheet, a view, a context, an answer, an insight, a pinboard, a tag, a comment, a trigger, a defined variable, a data source, an object-level security rule, a row-level security rule, or any other data capable of being distinctly identified and stored or otherwise obtained in the low-latency database analysis system 3000. An object may represent or correspond with a logical entity. Data describing an object may include data operatively or uniquely identifying data corresponding to, or represented by, the object in the low-latency database analysis system. For example, a column in a table in a database in the low-latency database analysis system may be represented in the low-latency database analysis system as an object and the data describing or defining the object may include data operatively or uniquely identifying the column.

A worksheet (worksheet object), or worksheet table, may be a logical table, or a definition thereof, which may be a collection, a sub-set (such as a subset of columns from one or more tables), or both, of data from one or more data sources, such as columns in one or more tables, such as in the distributed in-memory database 3300. A worksheet, or a definition thereof, may include one or more data organization or manipulation definitions, such as join paths or worksheet-column definitions, which may be user defined. A worksheet may be a data structure that may contain one or more rules or definitions that may define or describe how a respective tabular set of data may be obtained, which may include defining one or more sources of data, such as one or more columns from the distributed in-memory database 3300. A worksheet may be a data source. For example, a worksheet may include references to one or more data sources, such as columns in one or more tables, such as in the distributed in-memory database 3300, and a request for data referencing the worksheet may access the data from the data sources referenced in the worksheet. In some implementations, a worksheet may omit aggregations of the data from the data sources referenced in the worksheet.

An answer (answer object), or report, may be a defined, such as previously generated, request for data, such as a resolved-request. An answer may include information describing a visualization of data responsive to the request for data.

A view (view object) may be a logical table, or a definition thereof, which may be a collection, a sub-set, or both, of data from one or more data sources, such as columns in one or more tables, such as in the distributed in-memory database 3300. For example, a view may be generated based on an answer, such as by storing the answer as a view. A view may define or describe a data aggregation. A view may be a data source. For example, a view may include references to one or more data sources, such as columns in one or more tables, such as in the distributed in-memory database 3300, which may include a definition or description of an aggregation of the data from a respective data source, and a request for data referencing the view may access the aggregated data, the data from the unaggregated data sources referenced in the worksheet, or a combination thereof. The unaggregated data from data sources referenced in the worksheet defined or described as aggregated data in the view may be unavailable based on the view. A view may be a materialized view or an unmaterialized view. A request for data referencing a materialized view may obtain data from a set of data previously obtained (view-materialization) in accordance with the definition of the view and the request for data. A request for data referencing an unmaterialized view may obtain data from a set of data currently obtained in accordance with the definition of the view and the request for data.

A pinboard (pinboard object), or dashboard, may be a defined collection or grouping of objects, such as visualizations, answers, or insights. Pinboard data for a pinboard may include information associated with the pinboard, which may be associated with respective objects included in the pinboard.

A context (context object) may be a set or collection of data associated with a request for data or a discretely related sequence or series of requests for data or other interactions with the low-latency database analysis system 3000.

A definition may be a set of data describing the structure or organization of a data portion. For example, in the distributed in-memory database 3300, a column definition may define one or more aspects of a column in a table, such as a name of the column, a description of the column, a datatype for the column, or any other information about the column that may be represented as discrete data.

A data source object may represent a source or repository of data accessible by the low-latency database analysis system 3000. A data source object may include data indicating an electronic communication location, such as an address, of a data source, connection information, such as protocol information, authentication information, or a combination thereof, or any other information about the data source that may be represented as discrete data. For example, a data source object may represent a table in the distributed in-memory database 3300 and include data for accessing the table from the database, such as information identifying the database, information identifying a schema within the database, and information identifying the table within the schema within the database. An external data source object may represent an external data source. For example, an external data source object may include data indicating an electronic communication location, such as an address, of an external data source, connection information, such as protocol information, authentication information, or a combination thereof, or any other information about the external data source that may be represented as discrete data.

A sticker (sticker object) may be a description of a classification, category, tag, subject area, or other information that may be associated with one or more other objects such that objects associated with a sticker may be grouped, sorted, filtered, or otherwise identified based on the sticker. In the distributed in-memory database 3300 a tag may be a discrete data portion that may be associated with other data portions, such that data portions associated with a tag may be grouped, sorted, filtered, or otherwise identified based on the tag.

The distributed in-memory ontology unit 3500 generates, maintains, or both, information (ontological data) defining or describing the operative ontological structure of the objects represented in the low-latency database analysis system 3000, such as in the low-latency data stored in the distributed in-memory database 3300, which may include describing attributes, properties, states, or other information about respective objects and may include describing relationships among respective objects.

Objects may be referred to herein as primary objects, secondary objects, or tertiary objects. Other types of objects may be used.

Primary objects may include objects representing distinctly identifiable operative data units or structures representing one or more data portions in the distributed in-memory database 3300, or another data source in the low-latency database analysis system 3000. For example, primary objects may be data source objects, table objects, column objects, relationship objects, or the like. Primary objects may include worksheets, views, filters, such as row-level-security filters and table filters, variables, or the like. Primary objects may be referred to herein as data-objects or queryable-objects.

Secondary objects may be objects representing distinctly identifiable operative data units or structures representing analytical data aggregations, collections, analytical results, visualizations, or groupings thereof, such as pinboard objects, answer objects, insights, visualization objects, and the like. Secondary objects may be referred to herein as analytical-objects.

Tertiary objects may be objects representing distinctly identifiable operative data units or structures representing operational aspects of the low-latency database analysis system 3000, such as one or more entities, users, groups, or organizations represented in the internal data, such as user objects, user-group objects, role objects, sticker objects, and the like.

The distributed in-memory ontology unit 3500 may represent the ontological structure, which may include the objects therein, as a graph having nodes and edges. A node may be a representation of an object in the graph structure of the distributed in-memory ontology unit 3500. A node object can include one or more component objects. Component objects may be versioned, such as on a per-component object basis. For example, a node can include a header object, a content object, or both. A header object may include information about the node. A content may include the content of the node. An edge may represent a relationship between nodes, which may be directional.

In some implementations, the distributed in-memory ontology unit 3500 graph may include one or more nodes, edges, or both, representing one or more objects, relationships or both, corresponding to a respective internal representation of enterprise data stored in an external enterprise data storage unit, wherein a portion of the data stored in the external enterprise data storage unit represented in the distributed in-memory ontology unit 3500 graph is omitted from the distributed in-memory database 3300.

In some embodiments, the distributed in-memory ontology unit 3500 may generate, modify, or remove a portion of the ontology graph in response to one or more messages, signals, or notifications from one or more of the components of the low-latency database analysis system 3000. For example, the distributed in-memory ontology unit 3500 may generate, modify, or remove a portion of the ontology graph in response to receiving one or more messages, signals, or notifications from the distributed in-memory database 3300 indicating a change to the low-latency data structure. In another example, the distributed in-memory database 3300 may send one or more messages, signals, or notifications indicating a change to the low-latency data structure to the semantic interface unit 3600 and the semantic interface unit 3600 may send one or more messages, signals, or notifications indicating the change to the low-latency data structure to the distributed in-memory ontology unit 3500.

The distributed in-memory ontology unit 3500 may be distributed, in-memory, multi-versioned, transactional, consistent, durable, or a combination thereof. The distributed in-memory ontology unit 3500 is transactional, which may include implementing atomic concurrent, or substantially concurrent, updating of multiple objects. The distributed in-memory ontology unit 3500 is durable, which may include implementing a robust storage that prevents data loss subsequent to or as a result of the completion of an atomic operation. The distributed in-memory ontology unit 3500 is consistent, which may include performing operations associated with a request for data with reference to or using a discrete data set, which may mitigate or eliminate the risk inconsistent results.

The distributed in-memory ontology unit 3500 may generate, output, or both, one or more event notifications. For example, the distributed in-memory ontology unit 3500 may generate, output, or both, a notification, or notifications, in response to a change of the distributed in-memory ontology. The distributed in-memory ontology unit 3500 may identify a portion of the distributed in-memory ontology (graph) associated with a change of the distributed in-memory ontology, such as one or more nodes depending from a changed node, and may generate, output, or both, a notification, or notifications indicating the identified relevant portion of the distributed in-memory ontology (graph). One or more aspects of the low-latency database analysis system 3000 may cache object data and may receive the notifications from the distributed in-memory ontology unit 3500, which may reduce latency and network traffic relative to systems that omit caching object data or omit notifications relevant to changes to portions of the distributed in-memory ontology (graph).

The distributed in-memory ontology unit 3500 may implement prefetching. For example, the distributed in-memory ontology unit 3500 may predictively, such as based on determined probabilistic utility, fetch one or more nodes, such as in response to access to a related node by a component of the low-latency database analysis system 3000.

The distributed in-memory ontology unit 3500 may implement a multi-version concurrency control graph data storage unit. Each node, object, or both, may be versioned. Changes to the distributed in-memory ontology may be reversible. For example, the distributed in-memory ontology may have a first state prior to a change to the distributed in-memory ontology, the distributed in-memory ontology may have a second state subsequent to the change, and the state of the distributed in-memory ontology may be reverted to the first state subsequent to the change, such as in response to the identification of an error or failure associated with the second state.

In some implementations, reverting a node, or a set of nodes, may omit reverting one or more other nodes. In some implementations, the distributed in-memory ontology unit 3500 may maintain a change log indicating a sequential record of changes to the distributed in-memory ontology (graph), such that a change to a node or a set of nodes may be reverted and one or more other changes subsequent to the reverted change may be reverted for consistency.

The distributed in-memory ontology unit 3500 may implement optimistic locking to reduce lock contention times. The use of optimistic locking permits improved throughput of data through the distributed in-memory ontology unit 3500.

The semantic interface unit 3600 may implement procedures and functions to provide a semantic interface between the distributed in-memory database 3300 and one or more of the other components of the low-latency database analysis system 3000.

The semantic interface unit 3600 may implement ontological data management, data-query generation, authentication and access control, object statistical data collection, or a combination thereof.

Ontological data management may include object lifecycle management, object data persistence, ontological modifications, or the like. Object lifecycle management may include creating one or more objects, reading or otherwise accessing one or more objects, updating or modifying one or more objects, deleting or removing one or more objects, or a combination thereof. For example, the semantic interface unit 3600 may interface or communicate with the distributed in-memory ontology unit 3500, which may store the ontological data, object data, or both, to perform object lifecycle management, object data persistence, ontological modifications, or the like.

For example, the semantic interface unit 3600 may receive, or otherwise access, a message, signal, or notification, such as from the distributed in-memory database 3300, indicating the creation or addition of a data portion, such as a table, in the low-latency data stored in the distributed in-memory database 3300, and the semantic interface unit 3600 may communicate with the distributed in-memory ontology unit 3500 to create an object in the ontology representing the added data portion. The semantic interface unit 3600 may transmit, send, or otherwise make available, a notification, message, or signal to the relational search unit 3700 indicating that the ontology has changed.

The semantic interface unit 3600 may receive, or otherwise access, a request message or signal, such as from the relational search unit 3700, indicating a request for information describing changes to the ontology (ontological updates request). The semantic interface unit 3600 may generate and send, or otherwise make available, a response message or signal to the relational search unit 3700 indicating the changes to the ontology (ontological updates response). The semantic interface unit 3600 may identify one or more data portions for indexing based on the changes to the ontology. For example, the changes to the ontology may include adding a table to the ontology, the table including multiple rows, and the semantic interface unit 3600 may identify each row as a data portion for indexing. The semantic interface unit 3600 may include information describing the ontological changes in the ontological updates response. The semantic interface unit 3600 may include one or more data-query definitions, such as data-query definitions for indexing data-queries, for each data portion identified for indexing in the ontological updates response. For example, the data-query definitions may include a sampling data-query, which may be used to query the distributed in-memory database 3300 for sample data from the added data portion, an indexing data-query, which may be used to query the distributed in-memory database 3300 for data from the added data portion, or both.

The semantic interface unit 3600 may receive, or otherwise access, internal signals or messages including data expressing a usage intent, such as data indicating requests to access or modify the low-latency data stored in the distributed in-memory database 3300 (e.g., a request for data). The request to access or modify the low-latency data received by the semantic interface unit 3600 may include a resolved-request. The resolved-request, which may be database and visualization agnostic, may be expressed or communicated as an ordered sequence of tokens, which may represent semantic data. For example, the relational search unit 3700 may tokenize, identify semantics, or both, based on input data, such as input data representing user input, to generate the resolved-request. The resolved-request may include an ordered sequence of tokens that represent the request for data corresponding to the input data, and may transmit, send, or otherwise make accessible, the resolved-request to the semantic interface unit 3600. The semantic interface unit 3600 may process or respond to a received resolved-request.

The semantic interface unit 3600 may process or transform the received resolved-request, which may be, at least in part, incompatible with the distributed in-memory database 3300, to generate one or more corresponding data-queries that are compatible with the distributed in-memory database 3300, which may include generating a proto-query representing the resolved-request, generating a pseudo-query representing the proto-query, and generating the data-query representing the pseudo-query.

The semantic interface unit 3600 may generate a proto-query based on the resolved-request. A proto-query, which may be database agnostic, may be structured or formatted in a form, language, or protocol that differs from the defined structured query language of the distributed in-memory database 3300. Generating the proto-query may include identifying visualization identification data, such as an indication of a type of visualization, associated with the request for data, and generating the proto-query based on the resolved-request and the visualization identification data.

The semantic interface unit 3600 may transform the proto-query to generate a pseudo-query. The pseudo-query, which may be database agnostic, may be structured or formatted in a form, language, or protocol that differs from the defined structured query language of the distributed in-memory database 3300. Generating a pseudo-query may include applying a defined transformation, or an ordered sequence of transformations. Generating a pseudo-query may include incorporating row-level security filters in the pseudo-query.

The semantic interface unit 3600 may generate a data-query based on the pseudo-query, such as by serializing the pseudo-query. The data-query, or a portion thereof, may be structured or formatted using the defined structured query language of the distributed in-memory database 3300. In some implementations, a data-query may be structured or formatted using a defined structured query language of another database, which may differ from the defined structured query language of the distributed in-memory database 3300. Generating the data-query may include using one or more defined rules for expressing respective the structure and content of a pseudo-query in the respective defined structured query language.

The semantic interface unit 3600 may communicate, or issue, the data-query to the distributed in-memory database 3300. In some implementations, processing or responding to a resolved-request may include generating and issuing multiple data-query to the distributed in-memory database 3300.

The semantic interface unit 3600 may receive results data from the distributed in-memory database 3300 responsive to one or more resolved-requests. The semantic interface unit 3600 may process, format, or transform the results data to obtain visualization data.

Although not shown separately in FIG. 3, the semantic interface unit 3600 may include a data visualization unit. In some embodiments, the data visualization unit may be a distinct unit, separate from the semantic interface unit 3600. In some embodiments, the data visualization unit may be included in the system access interface unit 3900. The data visualization unit, the system access interface unit 3900, or a combination thereof, may generate a user interface, or one or more portions thereof. For example, data visualization unit, the system access interface unit 3900, or a combination thereof, may obtain the results data, such as the visualization data, and may generate user interface elements (visualizations) representing the results data.

The semantic interface unit 3600 may implement object-level security, row-level security, or a combination thereof. Object level security may include security associated with an object, such as a table, a column, a worksheet, an answer, or a pinboard. Row-level security may include user-based or group-based access control of rows of data in the low-latency data, the indexes, or both. The semantic interface unit 3600 may implement on or more authentication procedures, access control procedures, or a combination thereof.

The semantic interface unit 3600 may implement one or more user-data integration features. For example, the semantic interface unit 3600 may generate and output a user interface, or a portion thereof, for inputting, uploading, or importing user data, may receive user data, and may import the user data. For example, the user data may be enterprise data.

The semantic interface unit 3600 may implement object statistical data collection. Object statistical data may include, for respective objects, temporal access information, access frequency information, access recency information, access requester information, or the like. For example, the semantic interface unit 3600 may obtain object statistical data as described with respect to the data utility unit 3720, the object utility unit 3810, or both. The semantic interface unit 3600 may send, transmit, or otherwise make available, the object statistical data for data-objects to the data utility unit 3720. The semantic interface unit 3600 may send, transmit, or otherwise make available, the object statistical data for analytical-objects to the object utility unit 3810.

The semantic interface unit 3600 may implement or expose one or more services or application programming interfaces. For example, the semantic interface unit 3600 may implement one or more services for access by the system access interface unit 3900. In some implementations, one or more services or application programming interfaces may be exposed to one or more external devices or systems.

The semantic interface unit 3600 may generate and transmit, send, or otherwise communicate, one or more external communications, such as e-mail messages, such as periodically, in response to one or more events, or both. For example, the semantic interface unit 3600 may generate and transmit, send, or otherwise communicate, one or more external communications including a portable representation, such as a portable document format representation of one or more pinboards in accordance with a defined schedule, period, or interval. In another example, the semantic interface unit 3600 may generate and transmit, send, or otherwise communicate, one or more external communications in response to input data indicating an express request for a communication. In another example, the semantic interface unit 3600 may generate and transmit, send, or otherwise communicate, one or more external communications in response to one or more defined events, such as the expiration of a recency of access period for a user.

Although shown as a single unit in FIG. 3, the relational search unit 3700 may be implemented in a distributed configuration, which may include a primary relational search unit instance and one or more secondary relational search unit instances.

The relational search unit 3700 may generate, maintain, operate, or a combination thereof, one or more indexes, such as one or more of an ontological index, a constituent data index, a control-word index, a numeral index, or a constant index, based on the low-latency data stored in the distributed in-memory database 3300, the low-latency database analysis system 3000, or both. An index may be a defined data structure, or combination of data structures, for storing tokens, terms, or string keys, representing a set of data from one or more defined data sources in a form optimized for searching. For example, an index may be a collection of index shards. In some implementations, an index may be segmented into index segments and the index segments may be sharded into index shards. In some implementations, an index may be partitioned into index partitions, the index partitions may be segmented into index segments and the index segments may be sharded into index shards.

Generating, or building, an index may be performed to create or populate a previously unavailable index, which may be referred to as indexing the corresponding data, and may include regenerating, rebuilding, or reindexing to update or modify a previously available index, such as in response to a change in the indexed data (constituent data).

The ontological index may be an index of data (ontological data) describing the ontological structure or schema of the low-latency database analysis system 3000, the low-latency data stored in the distributed in-memory database 3300, or a combination thereof. For example, the ontological index may include data representing the table and column structure of the distributed in-memory database 3300. The relational search unit 3700 may generate, maintain, or both, the ontological index by communicating with, such as requesting ontological data from, the distributed in-memory ontology unit 3500, the semantic interface unit 3600, or both. Each record in the ontological index may correspond to a respective ontological token, such as a token that identifies a column by name.

The control-word index may be an index of a defined set of control-word tokens. A control-word token may be a character, a symbol, a word, or a defined ordered sequence of characters or symbols, that is identified in one or more grammars of the low-latency database analysis system 3000 as having one or more defined grammatical functions, which may be contextual. For example, the control-word index may include the control-word token "sum", which may be identified in one or more grammars of the low-latency database analysis system 3000 as indicating an additive aggregation. In another example, the control-word index may include the control-word token "top", which may be identified in one or more grammars of the low-latency database analysis system 3000 as indicating a maximal value from an ordered set. In another example, the control-word index may include operator tokens, such as the equality operator token ("="). The constant index may be an index of constant tokens such as "100" or "true". The numeral index may be an index of number word tokens (or named numbers), such as number word tokens for the positive integers between zero and one million, inclusive. For example, "one hundred and twenty eight".

A token may be a word, phrase, character, sequence of characters, symbol, combination of symbols, or the like. A token may represent a data portion in the low-latency data stored in the low-latency data structure. For example, the relational search unit 3700 may automatically generate respective tokens representing the attributes, the measures, the tables, the columns, the values, unique identifiers, tags, links, keys, or any other data portion, or combination of data portions, or a portion thereof. The relational search unit 3700 may classify the tokens, which may include storing token classification data in association with the tokens. For example, a token may be classified as an attribute token, a measure token, a value token, or the like.

The constituent data index may be an index of the constituent data values stored in the low-latency database analysis system 3000, such as in the distributed in-memory database 3300. The relational search unit 3700 may generate, maintain, or both, the constituent data index by communicating with, such as requesting data from, the distributed in-memory database 3300. For example, the relational search unit 3700 may send, or otherwise communicate, a message or signal to the distributed in-memory database 3300 indicating a request to perform an indexing data-query, the relational search unit 3700 may receive response data from the distributed in-memory database 3300 in response to the requested indexing data-query, and the relational search unit 3700 may generate the constituent data index, or a portion thereof, based on the response data. For example, the constituent data index may index data-objects.

An index shard may be used for token searching, such as exact match searching, prefix match searching, substring match searching, or suffix match searching. Exact match searching may include identifying tokens in the index shard that matches a defined target value. Prefix match searching may include identifying tokens in the index shard that include a prefix, or begin with a value, such as a character or string, that matches a defined target value. Substring match searching may include identifying tokens in the index shard that include a value, such as a character or string, that matches a defined target value. Suffix match searching may include identifying tokens in the index shard that include a suffix, or end with a value, such as a character or string, that matches a defined target value. In some implementations, an index shard may include multiple distinct index data structures. For example, an index shard may include a first index data structure optimized for exact match searching, prefix match searching, and suffix match searching, and a second index data structure optimized for sub string match searching. Traversing, or otherwise accessing, managing, or using, an index may include identifying one or more of the index shards of the index and traversing the respective index shards. In some implementations, one or more indexes, or index shards, may be distributed, such as replicated on multiple relational search unit instances. For example, the ontological index may be replicated on each relational search unit instance.

The relational search unit 3700 may receive a request for data from the low-latency database analysis system 3000. For example, the relational search unit 3700 may receive data expressing a usage intent indicating the request for data in response to input, such as user input, obtained via a user interface, such as a user interface generated, or partially generated, by the system access interface unit 3900, which may be a user interface operated on an external device, such as one of the client devices 2320, 2340 shown in FIG. 2. In some implementations, the relational search unit 3700 may receive the data expressing the usage intent from the system access interface unit 3900 or from the semantic interface unit 3600. For example, the relational search unit 3700 may receive or access the data expressing the usage intent in a request for data message or signal.

The relational search unit 3700 may process, parse, identify semantics, tokenize, or a combination thereof, the request for data to generate a resolved-request, which may include identifying a database and visualization agnostic ordered sequence of tokens based on the data expressing the usage intent. The data expressing the usage intent, or request for data, may include request data, such as resolved request data, unresolved request data, or a combination of resolved request data and unresolved request data. The relational search unit 3700 may identify the resolved request data. The relational search unit 3700 may identify the unresolved request data and may tokenize the unresolved request data.

Resolved request data may be request data identified in the data expressing the usage intent as resolved request data. Each resolved request data portion may correspond with a respective token in the low-latency database analysis system 3000. The data expressing the usage intent may include information identifying one or more portions of the request data as resolved request data.

Unresolved request data may be request data identified in the data expressing the usage intent as unresolved request data, or request data for which the data expressing the usage intent omits information identifying the request data a resolved request data. Unresolved request data may include text or string data, which may include a character, sequence of characters, symbol, combination of symbols, word, sequence of words, phrase, or the like, for which information, such as tokenization binding data, identifying the text or string data as resolved request data is absent or omitted from the request data. The data expressing the usage intent may include information identifying one or more portions of the request data as unresolved request data. The data expressing the usage intent may omit information identifying whether one or more portions of the request data are resolved request data. The relational search unit 3700 may identify one or more portions of the request data for which the data expressing the usage intent omits information identifying whether the one or more portions of the request data are resolved request data as unresolved request data.

For example, the data expressing the usage intent may include a request string and one or more indications that one or more portions of the request string are resolved request data. One or more portions of the request string that are not identified as resolved request data in the data expressing the usage intent may be identified as unresolved request data. For example, the data expressing the usage intent may include the request string "example text"; the data expressing the usage intent may include information indicating that the first portion of the request string, "example", is resolved request data; and the data expressing the usage intent may omit information indicating that the second portion of the request string, "text", is resolved request data.

The information identifying one or more portions of the request data as resolved request data may include tokenization binding data indicating a previously identified token corresponding to the respective portion of the request data. The tokenization binding data corresponding to a respective token may include, for example, one or more of a column identifier indicating a column corresponding to the respective token, a data type identifier corresponding to the respective token, a table identifier indicating a table corresponding to the respective token, an indication of an aggregation corresponding to the respective token, or an indication of a join path associated with the respective token. Other tokenization binding data may be used. In some implementations, the data expressing the usage intent may omit the tokenization binding data and may include an identifier that identifies the tokenization binding data.

The relational search unit 3700 may implement or access one or more grammar-specific tokenizers, such as a tokenizer for a defined relational search grammar or a tokenizer for a natural-language grammar. For example, the relational search unit 3700 may implement one or more of a formula tokenizer, a row-level-security tokenizer, a relational search tokenizer, or a natural language tokenizer. Other tokenizers may be used. In some implementations, the relational search unit 3700 may implement one or more of the grammar-specific tokenizers, or a portion thereof, by accessing another component of the low-latency database analysis system 3000 that implements the respective grammar-specific tokenizer, or a portion thereof. For example, the natural language processing unit 3710 may implement the natural language tokenizer and the relational search unit 3700 may access the natural language processing unit 3710 to implement natural language tokenization.

A tokenizer, such as the relational search tokenizer, may parse text or string data (request string), such as string data included in a data expressing the usage intent, in a defined read order, such as from left to right, such as on a character-by-character or symbol-by-symbol basis. For example, a request string may include a single character, symbol, or letter, and tokenization may include identifying one or more tokens matching, or partially matching, the input character.

Tokenization may include parsing the request string to identify one or more words or phrases. For example, the request string may include a sequence of characters, symbols, or letters, and tokenization may include parsing the sequence of characters in a defined order, such as from left to right, to identify distinct words or terms and identifying one or more tokens matching the respective words. In some implementations, word or phrase parsing may be based on one or more of a set of defined delimiters, such as a whitespace character, a punctuation character, or a mathematical operator.

The relational search unit 3700 may traverse one or more of the indexes to identify one or more tokens corresponding to a character, word, or phrase identified in request string. Tokenization may include identifying multiple candidate tokens matching a character, word, or phrase identified in request string. Candidate tokens may be ranked or ordered, such as based on probabilistic utility.

Tokenization may include match-length maximization. Match-length maximization may include ranking or ordering candidate matching tokens in descending magnitude order. For example, the longest candidate token, having the largest cardinality of characters or symbols, matching the request string, or a portion thereof, may be the highest ranked candidate token. For example, the request string may include a sequence of words or a semantic phrase, and tokenization may include identifying one or more tokens matching the input semantic phrase. In another example, the request string may include a sequence of phrases, and tokenization may include identifying one or more tokens matching the input word sequence. In some implementations, tokenization may include identifying the highest ranked candidate token for a portion of the request string as a resolved token for the portion of the request string.

The relational search unit 3700 may implement one or more finite state machines. For example, tokenization may include using one or more finite state machines. A finite state machine may model or represent a defined set of states and a defined set of transitions between the states. A state may represent a condition of the system represented by the finite state machine at a defined temporal point. A finite state machine may transition from a state (current state) to a subsequent state in response to input (e.g., input to the finite state machine). A transition may define one or more actions or operations that the relational search unit 3700 may implement. One or more of the finite state machines may be non-deterministic, such that the finite state machine may transition from a state to zero or more subsequent states.

The relational search unit 3700 may generate, instantiate, or operate a tokenization finite state machine, which may represent the respective tokenization grammar. Generating, instantiating, or operating a finite state machine may include operating a finite state machine traverser for traversing the finite state machine. Instantiating the tokenization finite state machine may include entering an empty state, indicating the absence of received input. The relational search unit 3700 may initiate or execute an operation, such as an entry operation, corresponding to the empty state in response to entering the empty state. Subsequently, the relational search unit 3700 may receive input data, and the tokenization finite state machine may transition from the empty state to a state corresponding to the received input data. In some embodiments, the relational search unit 3700 may initiate one or more data-queries in response to transitioning to or from a respective state of a finite state machine. In the tokenization finite state machine, a state may represent a possible next token in the request string. The tokenization finite state machine may transition between states based on one or more defined transition weights, which may indicate a probability of transiting from a state to a subsequent state.

The tokenization finite state machine may determine tokenization based on probabilistic path utility. Probabilistic path utility may rank or order multiple candidate traversal paths for traversing the tokenization finite state machine based on the request string. The candidate paths may be ranked or ordered based on one or more defined probabilistic path utility metrics, which may be evaluated in a defined sequence. For example, the tokenization finite state machine may determine probabilistic path utility by evaluating the weights of the respective candidate transition paths, the lengths of the respective candidate transition paths, or a combination thereof. In some implementations, the weights of the respective candidate transition paths may be evaluated with high priority relative to the lengths of the respective candidate transition paths.

In some implementations, one or more transition paths evaluated by the tokenization finite state machine may include a bound state such that the candidate tokens available for tokenization of a portion of the request string may be limited based on the tokenization of a previously tokenized portion of the request string.

Tokenization may include matching a portion of the request string to one or more token types, such as a constant token type, a column name token type, a value token type, a control-word token type, a date value token type, a string value token type, or any other token type defined by the low-latency database analysis system 3000. A constant token type may be a fixed, or invariant, token type, such as a numeric value. A column name token type may correspond with a name of a column in the data model. A value token type may correspond with an indexed data value. A control-word token type may correspond with a defined set of control-words. A date value token type may be similar to a control-word token type and may correspond with a defined set of control-words for describing temporal information. A string value token type may correspond with an unindexed value.

Token matching may include ordering or weighting candidate token matches based on one or more token matching metrics. Token matching metrics may include whether a candidate match is within a defined data scope, such as a defined set of tables, wherein a candidate match outside the defined data scope (out-of-scope) may be ordered or weighted lower than a candidate match within the define data scope (in-scope). Token matching metrics may include whether, or the degree to which, a candidate match increases query complexity, such as by spanning multiple roots, wherein a candidate match that increases complexity may be ordered or weighted lower than a candidate match that does not increase complexity or increases complexity to a lesser extent. Token matching metrics may include whether the candidate match is an exact match or a partial match, wherein a candidate match that is a partial may be ordered or weighted lower than a candidate match that is an exact match. In some implementations, the cardinality of the set of partial matches may be limited to a defined value.

Token matching metrics may include a token score (TokenScore), wherein a candidate match with a relatively low token score may be ordered or weighted lower than a candidate match with a relatively high token score. The token score for a candidate match may be determined based one or more token scoring metrics. The token scoring metrics may include a finite state machine transition weight metric (FSMScore), wherein a weight of transitioning from a current state of the tokenization finite state machine to a state indicating a candidate matching token is the finite state machine transition weight metric. The token scoring metrics may include a cardinality penalty metric (CardinalityScore), wherein a cardinality of values (e.g., unique values) corresponding to the candidate matching token is used as a penalty metric (inverse cardinality), which may reduce the token score. The token scoring metrics may include an index utility metric (IndexScore), wherein a defined utility value, such as one, associated with an object, such as a column wherein the matching token represents the column or a value from the column, is the index utility metric. In some implementations, the defined utility values may be configured, such as in response to user input, on a per object (e.g., per column) basis. The token scoring metrics may include a usage metric (UBRScore). The usage metric may be determined based on a usage based ranking index, one or more usage ranking metrics, or a combination thereof. Determining the usage metric (UBRScore) may include determining a usage boost value (UBRBoost). The token score may be determined based on a defined combination of token scoring metrics. For example, determining the token score may be expressed as the following:

$$TokenScore=FSMScore*(IndexScore+UBRScore*UBRBoost)+Min(CardinalityScore, 1).$$

Token matching may include grouping candidate token matches by match type, ranking or ordering on a per-match type basis based on token score, and ranking or ordering the match types. For example, the match types may include a first match type for exact matches (having the highest match type priority order), a second match type for prefix matches on ontological data (having a match type priority order lower than the first match type), a third match type for substring matches on ontological data and prefix matches on data values (having a match type priority order lower than the second match type), a fourth match type for substring matches on data values (having a match type priority order lower than the third match type), and a fifth match type for matches omitted from the first through fourth match types (having a match type priority order lower than the fourth match type). Other match types and match type orders may be used.

Tokenization may include ambiguity resolution. Ambiguity resolution may include token ambiguity resolution, join-path ambiguity resolution, or both. In some implementations, ambiguity resolution may cease tokenization in response to the identification of an automatic ambiguity resolution error or failure.

Token ambiguity may correspond with identifying two or more exactly matching candidate matching tokens. Token ambiguity resolution may be based on one or more token ambiguity resolution metrics. The token ambiguity resolution metrics may include using available previously resolved token matching or binding data and token ambiguity may be resolved in favor of available previously resolved token matching or binding data, other relevant tokens resolved from the request string, or both. The token ambiguity resolution may include resolving token ambiguity in favor of integer constants. The token ambiguity resolution may include resolving token ambiguity in favor of control-words, such as for tokens at the end of a request for data, such as last, that are not being edited.

Join-path ambiguity may correspond with identifying matching tokens having two or more candidate join paths. Join-path ambiguity resolution may be based on one or more join-path ambiguity resolution metrics. The join-path ambiguity resolution metrics may include using available previously resolved join-path binding data and join-path ambiguity may be resolved in favor of available previously resolved join-paths. The join-path ambiguity resolution may include favoring join paths that include in-scope objects over join paths that include out-of-scope objects. The join-path ambiguity resolution metrics may include a complexity minimization metric, which may favor a join path that omits or avoids increasing complexity over join paths that increase complexity, such as a join path that may introduce a chasm trap.

The relational search unit 3700 may identify a resolved-request based on the request string. The resolved-request, which may be database and visualization agnostic, may be expressed or communicated as an ordered sequence of tokens representing the request for data indicated by the request string. The relational search unit 3700 may instantiate, or generate, one or more resolved-request objects. For example, the relational search unit 3700 may create or store a resolved-request object corresponding to the resolved-request in the distributed in-memory ontology unit 3500. The relational search unit 3700 may transmit, send, or otherwise make available, the resolved-request to the semantic interface unit 3600.

In some implementations, the relational search unit 3700 may transmit, send, or otherwise make available, one or more resolved-requests, or portions thereof, to the semantic interface unit 3600 in response to finite state machine transitions. For example, the relational search unit 3700 may instantiate a search object in response to a first transition of a finite state machine. The relational search unit 3700 may include a first search object instruction in the search object in response to a second transition of the finite state machine. The relational search unit 3700 may send the search object including the first search object instruction to the semantic interface unit 3600 in response to the second transition of the finite state machine. The relational search unit 3700 may include a second search object instruction in the search object in response to a third transition of the finite state machine. The relational search unit 3700 may send the search object including the search object instruction, or a combination of the first search object instruction and the second search object instruction, to the semantic interface unit 3600 in response to the third transition of the finite state machine. The search object instructions may be represented using any annotation, instruction, text, message, list, pseudo-code, comment, or the like, or any combination thereof that may be converted, transcoded, or translated into structured search instructions for retrieving data from the low-latency data.

The relational search unit 3700 may provide an interface to permit the creation of user-defined syntax. For example, a user may associate a string with one or more tokens. Accordingly, when the string is entered, the pre-associated tokens are returned in lieu of searching for tokens to match the input.

The relational search unit 3700 may include a localization unit (not expressly shown). The localization, globalization, regionalization, or internationalization, unit may obtain source data expressed in accordance with a source expressive-form and may output destination data representing the source data, or a portion thereof, and expressed using a destination expressive-form. The data expressive-forms, such as the source expressive-form and the destination expressive-form, may include regional or customary forms of expression, such as numeric expression, temporal expression, currency expression, alphabets, natural-language elements, measurements, or the like. For example, the source expressive-form may be expressed using a canonical-form, which may include using a natural-language, which may be based on English, and the destination expressive-form may be expressed using a locale-specific form, which may include using another natural-language, which may be a natural-language that differs from the canonical-language. In another example, the destination expressive-form and the source expressive-form may be locale-specific expressive-forms and outputting the destination expressive-form representation of the source expressive-form data may include obtaining a canonical-form representation of the source expressive-form data and obtaining the destination expressive-form representation based on the canonical-form representation. Although, for simplicity and clarity, the grammars described herein, such as the relational search grammar and the natural language search grammar, are described with relation to the canonical expressive-form, the implementation of the respective grammars, or portions thereof, described herein may implement locale-specific expressive-forms. For example, the relational search tokenizer may include multiple locale-specific relational search tokenizers.

The natural language processing unit 3710 may receive input data including a natural language string, such as a natural language string generated in accordance with user input. The natural language string may represent a data request expressed in an unrestricted natural language form, for which data identified or obtained prior to, or in conjunction with, receiving the natural language string by the natural language processing unit 3710 indicating the semantic structure, correlation to the low-latency database analysis system 3000, or both, for at least a portion of the natural language string is unavailable or incomplete. Although not shown separately in FIG. 3, in some implementations, the natural language string may be generated or determined based on processing an analog signal, or a digital representation thereof, such as an audio stream or recording or a video stream or recording, which may include using speech-to-text conversion.

The natural language processing unit 3710 may analyze, process, or evaluate the natural language string, or a portion thereof, to generate or determine the semantic structure, correlation to the low-latency database analysis system 3000, or both, for at least a portion of the natural language string. For example, the natural language processing unit 3710 may identify one or more words or terms in the natural language string and may correlate the identified words to tokens defined in the low-latency database analysis system 3000. In another example, the natural language processing unit 3710 may identify a semantic structure for the natural language string, or a portion thereof. In another example, the natural language processing unit 3710 may identify a probabilistic intent for the natural language string, or a portion thereof, which may correspond to an operative feature of the low-latency database analysis system 3000, such as retrieving data from the internal data, analyzing data the internal data, or modifying the internal data.

The natural language processing unit 3710 may send, transmit, or otherwise communicate request data indicating the tokens, relationships, semantic data, probabilistic intent, or a combination thereof or one or more portions thereof, identified based on a natural language string to the relational search unit 3700.

The data utility unit 3720 may receive, process, and maintain user-agnostic utility data, such as system configuration data, user-specific utility data, such as utilization data, or both user-agnostic and user-specific utility data. The utility data may indicate whether a data portion, such as a column, a record, an insight, or any other data portion, has high utility or low utility within the system, such across all users of the system. For example, the utility data may indicate that a defined column is a high-utility column or a low-utility column. The data utility unit 3720 may store the utility data, such as using the low-latency data structure. For example, in response to a user using, or accessing, a data portion, data utility unit 3720 may store utility data indicating the usage, or access, event for the data portion, which may include incrementing a usage event counter associated with the data portion. In some embodiments, the data utility unit 3720 may receive the information indicating the usage, or access, event for the data portion from the insight unit 3730, and the usage, or access, event for the data portion may indicate that the usage is associated with an insight.

The data utility unit 3720 may receive a signal, message, or other communication, indicating a request for utility information. The request for utility information may indicate an object or data portion. The data utility unit 3720 may determine, identify, or obtain utility data associated with the identified object or data portion. The data utility unit 3720 may generate and send utility response data responsive to the request that may indicate the utility data associated with the identified object or data portion.

The data utility unit 3720 may generate, maintain, operate, or a combination thereof, one or more indexes, such as one or more of a usage (or utility) index, a resolved-request index, or a phrase index, based on the low-latency data stored in the distributed in-memory database 3300, the low-latency database analysis system 3000, or both.

The insight unit 3730 may automatically identify one or more insights, which may be data other than data expressly requested by a user, and which may be identified and prioritized, or both, based on probabilistic utility.

The object search unit 3800 may generate, maintain, operate, or a combination thereof, one or more object-indexes, which may be based on the analytical-objects represented in the low-latency database analysis system 3000, or a portion thereof, such as pinboards, answers, and worksheets. An object-index may be a defined data structure, or combination of data structures, for storing analytical-object data in a form optimized for searching. Although shown as a single unit in FIG. 3, the object search unit 3800 may interface with a distinct, separate, object indexing unit (not expressly shown).

The object search unit 3800 may include an object-index population interface, an object-index search interface, or both. The object-index population interface may obtain and store, load, or populate analytical-object data, or a portion thereof, in the object-indexes. The object-index search interface may efficiently access or retrieve analytical-object data from the object-indexes such as by searching or traversing the object-indexes, or one or more portions thereof. In some implementations, the object-index population interface, or a portion thereof, may be a distinct, independent unit.

The object-index population interface may populate, update, or both the object-indexes, such as periodically, such as in accordance with a defined temporal period, such as thirty minutes. Populating, or updating, the object-indexes may include obtaining object indexing data for indexing the analytical-objects represented in the low-latency database analysis system 3000. For example, the object-index population interface may obtain the analytical-object indexing data, such as from the distributed in-memory ontology unit 3500. Populating, or updating, the object-indexes may include generating or creating an indexing data structure representing an object. The indexing data structure for representing an object may differ from the data structure used for representing the object in other components of the low-latency database analysis system 3000, such as in the distributed in-memory ontology unit 3500.

The object indexing data for an analytical-object may be a subset of the object data for the analytical-object. The object indexing data for an analytical-object may include an object identifier for the analytical-object uniquely identifying the analytical-object in the low-latency database analysis system 3000, or in a defined data-domain within the low-latency database analysis system 3000. The low-latency database analysis system 3000 may uniquely, unambiguously, distinguish an object from other objects based on the object identifier associated with the object. The object indexing data for an analytical-object may include data non-uniquely identifying the object. The low-latency database analysis system 3000 may identify one or more analytical-objects based on the non-uniquely identifying data associated with the respective objects, or one or more portions thereof. In some implementations, an object identifier may be an ordered combination of non-uniquely identifying object data that, as expressed in the ordered combination, is uniquely identifying. The low-latency database analysis system 3000 may enforce the uniqueness of the object identifiers.

Populating, or updating, the object-indexes may include indexing the analytical-object by including or storing the object indexing data in the object-indexes. For example, the object indexing data may include data for an analytical-object, the object-indexes may omit data for the analytical-object, and the object-index population interface may include or store the object indexing data in an object-index. In another example, the object indexing data may include data for an analytical-object, the object-indexes may include data for the analytical-object, and the object-index population interface may update the object indexing data for the analytical-object in the object-indexes in accordance with the object indexing data.

Populating, or updating, the object-indexes may include obtaining object utility data for the analytical-objects represented in the low-latency database analysis system 3000. For example, the object-index population interface may obtain the object utility data, such as from the object utility unit 3810. The object-index population interface may include the object utility data in the object-indexes in association with the corresponding objects.

In some implementations, the object-index population interface may receive, obtain, or otherwise access the object utility data from a distinct, independent, object utility data population unit, which may read, obtain, or otherwise access object utility data from the object utility unit 3810 and may send, transmit, or otherwise provide, the object utility data to the object search unit 3800. The object utility data population unit may send, transmit, or otherwise provide, the object utility data to the object search unit 3800 periodically, such as in accordance with a defined temporal period, such as thirty minutes.

The object-index search interface may receive, access, or otherwise obtain data expressing a usage intent with respect to the low-latency database analysis system 3000, which may represent a request to access data in the low-latency database analysis system 3000, which may represent a request to access one or more analytical-objects represented in the low-latency database analysis system 3000. The object-index search interface may generate one or more object-index queries based on the data expressing the usage intent. The object-index search interface may send, transmit, or otherwise make available the object-index queries to one or more of the object-indexes.

The object-index search interface may receive, obtain, or otherwise access object search results data indicating one or more analytical-objects identified by searching or traversing the object-indexes in accordance with the object-index queries. The object-index search interface may sort or rank the object search results data based on probabilistic utility in accordance with the object utility data for the analytical-objects in the object search results data. In some implementations, the object-index search interface may include one or more object search ranking metrics with the object-index queries and may receive the object search results data sorted or ranked based on probabilistic utility in accordance with the object utility data for the objects in the object search results data and in accordance with the object search ranking metrics.

For example, the data expressing the usage intent may include a user identifier, and the object search results data may include object search results data sorted or ranked based on probabilistic utility for the user. In another example, the data expressing the usage intent may include a user identifier and one or more search terms, and the object search results data may include object search results data sorted or ranked based on probabilistic utility for the user identified by searching or traversing the object-indexes in accordance with the search terms.

The object-index search interface may generate and send, transmit, or otherwise make available the sorted or ranked object search results data to another component of the low-latency database analysis system 3000, such as for further processing and display to the user.

The object utility unit 3810 may receive, process, and maintain user-specific object utility data for objects represented in the low-latency database analysis system 3000. The user-specific object utility data may indicate whether an object has high utility or low utility for the user.

The object utility unit 3810 may store the user-specific object utility data, such as on a per-object basis, a per-activity basis, or both. For example, in response to data indicating an object access activity, such as a user using, viewing, or otherwise accessing, an object, the object utility unit 3810 may store user-specific object utility data indicating the object access activity for the object, which may include incrementing an object access activity counter associated with the object, which may be a user-specific object access activity counter. In another example, in response to data indicating an object storage activity, such as a user storing an object, the object utility unit 3810 may store user-specific object utility data indicating the object storage activity for the object, which may include incrementing a storage activity counter associated with the object, which may be a user-specific object storage activity counter. The user-specific object utility data may include temporal information, such as a temporal location identifier associated with the object activity. Other information associated with the object activity may be included in the object utility data.

The object utility unit 3810 may receive a signal, message, or other communication, indicating a request for object utility information. The request for object utility information may indicate one or more objects, one or more users, one or more activities, temporal information, or a combination thereof. The request for object utility information may indicate a request for object utility data, object utility counter data, or both.

The object utility unit 3810 may determine, identify, or obtain object utility data in accordance with the request for object utility information. The object utility unit 3810 may generate and send object utility response data responsive to the request that may indicate the object utility data, or a portion thereof, in accordance with the request for object utility information.

For example, a request for object utility information may indicate a user, an object, temporal information, such as information indicating a temporal span, and an object activity, such as the object access activity. The request for object utility information may indicate a request for object utility counter data. The object utility unit 3810 may determine, identify, or obtain object utility counter data associated with the user, the object, and the object activity having a temporal location within the temporal span, and the object utility unit 3810 may generate and send object utility response data including the identified object utility counter data.

In some implementations, a request for object utility information may indicate multiple users, or may omit indicating a user, and the object utility unit 3810 may identify user-agnostic object utility data aggregating the user-specific object utility data. In some implementations, a request for object utility information may indicate multiple objects, may omit indicating an object, or may indicate an object type, such as answer, pinboard, or worksheet, and the object utility unit 3810 may identify the object utility data by aggregating the object utility data for multiple objects in accordance with the request. Other object utility aggregations may be used.

The system configuration unit 3820 implement or apply one or more low-latency database analysis system configurations to enable, disable, or configure one or more operative features of the low-latency database analysis system 3000. The system configuration unit 3820 may store data representing or defining the one or more low-latency database analysis system configurations. The system configuration unit 3820 may receive signals or messages indicating input data, such as input data generated via a system access interface, such as a user interface, for accessing or modifying the low-latency database analysis system configurations. The system configuration unit 3820 may generate, modify, delete, or otherwise maintain the low-latency database analysis system configurations, such as in response to the input data. The system configuration unit 3820 may generate or determine output data, and may output the output data, for a system access interface, or a portion or portions thereof, for the low-latency database analysis system configurations, such as for presenting a user interface for the low-latency database analysis system configurations. Although not shown in FIG. 3, the system configuration unit 3820 may communicate with a repository, such as an external centralized repository, of low-latency database analysis system configurations; the system configuration unit 3820 may receive one or more low-latency database analysis system configurations from the repository, and may control or configure one or more operative features of the low-latency database analysis system 3000 in response to receiving one or more low-latency database analysis system configurations from the repository.

The user customization unit 3830 may receive, process, and maintain user-specific utility data, such as user defined configuration data, user defined preference data, or a combination thereof. The user-specific utility data may indicate whether a data portion, such as a column, a record, an insight, or any other data portion or object, has high utility or low utility to an identified user. For example, the user-specific utility data may indicate that a defined column is a high-utility column or a low-utility column. The user customization unit 3830 may store the user-specific utility data, such as using the low-latency data structure. The user customization unit 3830 may store the feedback at an individual level and may include the context in which feedback was received from the user. Feedback may be stored in a disk-based system. In some implementations, feedback may be stored in an in-memory storage.

The system access interface unit 3900 may interface with, or communicate with, a system access unit (not shown in FIG. 3), which may be a client device, a user device, or another external device or system, or a combination thereof, to provide access to the internal data, features of the low-latency database analysis system 3000, or a combination thereof. For example, the system access interface unit 3900 may receive signals, message, or other communications representing interactions with the internal data, such as data expressing a usage intent and may output response messages, signals, or other communications responsive to the received requests.

The system access interface unit 3900 may generate data for presenting a user interface, or one or more portions thereof, for the low-latency database analysis system 3000. For example, the system access interface unit 3900 may generate instructions for rendering, or otherwise presenting, the user interface, or one or more portions thereof and may transmit, or otherwise make available, the instructions for rendering, or otherwise presenting, the user interface, or one or more portions thereof to the system access unit, for presentation to a user of the system access unit. For example, the system access unit may present the user interface via a web browser or a web application and the instructions may be in the form of HTML, JavaScript, or the like.

In an example, the system access interface unit 3900 may include a search field user interface element in the user interface. The search field user interface element may be an unstructured search string user input element or field. The system access unit may display the unstructured search string user input element. The system access unit may receive input data, such as user input data, corresponding to the unstructured search string user input element. The system access unit may transmit, or otherwise make available, the unstructured search string user input to the system access interface unit 3900. The user interface may include other user interface elements and the system access unit may transmit, or otherwise make available, other user input data to the system access interface unit 3900.

The system access interface unit 3900 may obtain the user input data, such as the unstructured search string, from the system access unit. The system access interface unit 3900 may transmit, or otherwise make available, the user input data to one or more of the other components of the low-latency database analysis system 3000.

In some embodiments, the system access interface unit 3900 may obtain the unstructured search string user input as a sequence of individual characters or symbols, and the system access interface unit 3900 may sequentially transmit, or otherwise make available, individual or groups of characters or symbols of the user input data to one or more of the other components of the low-latency database analysis system 3000.

In some embodiments, system access interface unit 3900 may obtain the unstructured search string user input may as a sequence of individual characters or symbols, the system access interface unit 3900 may aggregate the sequence of individual characters or symbols, and may sequentially transmit, or otherwise make available, a current aggregation of the received user input data to one or more of the other components of the low-latency database analysis system 3000, in response to receiving respective characters or symbols from the sequence, such as on a per-character or per-symbol basis.

The real-time collaboration unit 3910 may receive signals or messages representing input received in accordance with multiple users, or multiple system access devices, associated with a collaboration context or session, may output data, such as visualizations, generated or determined by the low-latency database analysis system 3000 to multiple users associated with the collaboration context or session, or both. The real-time collaboration unit 3910 may receive signals or messages representing input received in accordance with one or more users indicating a request to establish a collaboration context or session, and may generate, maintain, or modify collaboration data representing the collaboration context or session, such as a collaboration session identifier. The real-time collaboration unit 3910 may receive signals or messages representing input received in accordance with one or more users indicating a request to participate in, or otherwise associate with, a currently active collaboration context or session, and may associate the one or more users with the currently active collaboration context or session. In some implementations, the input, output, or both, of the real-time collaboration unit 3910 may include synchronization data, such as temporal data, that may be used to maintain synchronization, with respect to the collaboration context or session, among the low-latency database analysis system 3000 and one or more system access devices associated with, or otherwise accessing, the collaboration context or session.

The third-party integration unit 3920 may include an electronic communication interface, such as an application programming interface (API), for interfacing or communicating between an external, such as third-party, application or system, and the low-latency database analysis system 3000. For example, the third-party integration unit 3920 may include an electronic communication interface to transfer data between the low-latency database analysis system 3000 and one or more external applications or systems, such as by importing data into the low-latency database analysis system 3000 from the external applications or systems or exporting data from the low-latency database analysis system 3000 to the external applications or systems. For example, the third-party integration unit 3920 may include an electronic communication interface for electronic communication with an external exchange, transfer, load (ETL) system, which may import data into the low-latency database analysis system 3000 from an external data source or may export data from the low-latency database analysis system 3000 to an external data repository. In another example, the third-party integration unit 3920 may include an electronic communication interface for electronic communication with external machine learning analysis software, which may export data from the low-latency database analysis system 3000 to the external machine learning analysis software and may import data into the low-latency database analysis system 3000 from the external machine learning analysis software. The third-party integration unit 3920 may transfer data independent of, or in conjunction with, the system access interface unit 3900, the enterprise data interface unit 3400, or both.

Figure 4:
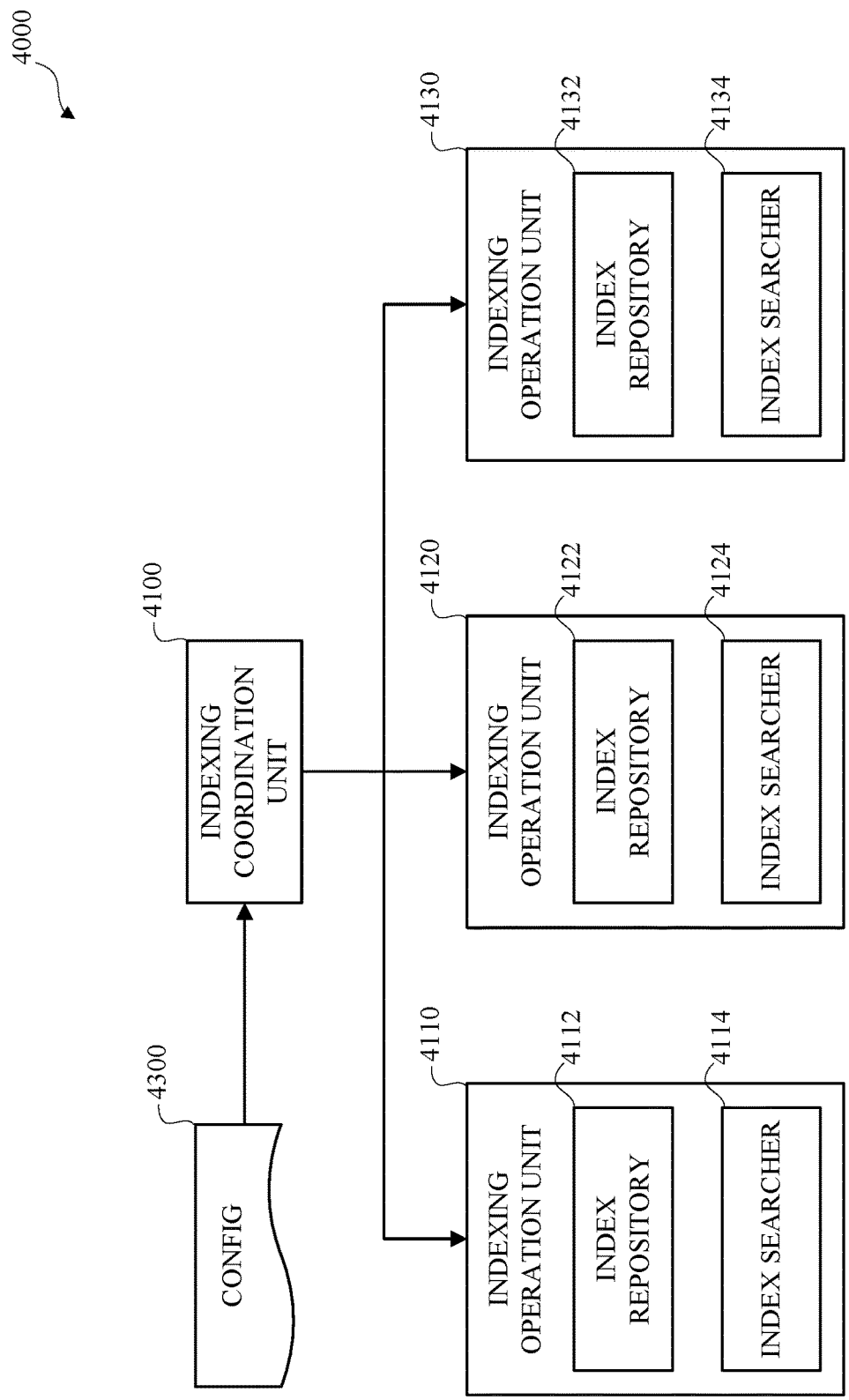
FIG. 4 is a block diagram of an example of a portion of an indexing unit of a low-latency database analysis system.

FIG. 4 is a block diagram of an example of a portion of an indexing unit 4000 of a low-latency database analysis system. For example, a relational search unit, such as the relational search unit 3700 of the low-latency database analysis system 3000 shown in FIG. 3, may include or implement the indexing unit 4000. The indexing unit 4000 may be implemented on one or more computing devices, such as servers 2220, 2240, 2260, and 2280 shown in FIG. 2, which may be in a clustered or distributed computing configuration.

As shown in FIG. 4, the indexing unit 4000 includes an indexing coordination unit 4100, a first indexing operation unit 4110, a second indexing operation unit 4120, and a third indexing operation unit 4130. Any number of indexing operation units may be used. Although not shown expressly in FIG. 4, implementing the indexing unit 4000 in a clustered or distributed computing configuration may include implementing the indexing coordination unit 4100 on a first node of the clustered or distributed computing configuration, implementing the first indexing operation unit 4110 on a second node of the clustered or distributed computing configuration, implementing the second indexing operation unit 4120 on a third node of the clustered or distributed computing configuration, and implementing the third indexing operation unit 4130 on a fourth node of the clustered or distributed computing configuration. The indexing coordination unit 4100 may be implemented as a service. The indexing coordination unit 4100 may be similar to the primary relational search unit described with respect to FIG. 3, except as described herein or otherwise clear from context. Although not expressly shown in FIG. 4, the indexing coordination unit 4100 may include one or more index managers (or index management units), an ontological manager (or ontological management unit), a shard manager (or shard management unit), an indexing scheduler, or any combination thereof.

Generating, maintaining, or operating an index may include partitioning the index into index partitions, such as via index partitioning. Index partitioning may include partitioning the constituent data that the index is indexing into two or more distinct index partitions. Each index partition may include a set, group, or collection of database objects, such as tables. Each index partition may be smaller, and may utilize fewer resources, than a corresponding monolithic (unpartitioned) index. For example, a first table from the constituent data may be indexed in a first index partition and a second table from the constituent data may be indexed into a second index partition. The resource utilization for generating, or regenerating, an index partition may be proportional to size of the respective partition (e.g., the amount of constituent data indexed in the respective partition). One or more index partitions may be generated, or regenerated, independently from generating, or regenerating, other index partitions. Index partitioning may include partitioning the constituent data that the index is indexing into two or more distinct index partitions based on table size or update frequency, which may improve the isolation and parallelism of index generation.

Generating, maintaining, or operating an index may include dividing an index partition into index segments, such as via index segmentation. Index segmentation may include segmenting the constituent data that the index partition is indexing into two or more distinct index segments. Each index segment may include a set, group, or collection of database objects, such as tables. Each index segment may be smaller, and may utilize fewer resources, than a corresponding monolithic (unsegmented) index or index partition. For example, a first table from the constituent data may be indexed in a first index segment and a second table from the constituent data may be indexed into a second index segment. The resource utilization for generating, or regenerating, an index segment may be proportional to size of the respective segment (e.g., the amount of constituent data indexed in the respective segment). One or more index segments may be generated, or regenerated, independently from generating, or regenerating, other index segments. Index segmentation may include segmenting the constituent data that the index partition is indexing into two or more distinct index segments based on table size or update frequency, which may improve the isolation and parallelism of index generation. In some implementations, index partitioning may be omitted, and the index may be segmented.

Generating, maintaining, or operating an index may include dividing an index segment into index shards, such as via index sharding. An index shard may be a portion of an index that may be implemented (created, loaded, operated) on a respective indexing operation unit 4110, 4120, 4130. An index shard may be a typed associative structure that may describe a relationship, or mapping, between a value, such as a string value, and a token data structure. An index shard may be templated based on the type of tokens indexed. An index shard may be an associative data structure for storing tokens (e.g., string keys) optimized for speed and efficiency. One or more of the index shards of an index may be stored, operated, or both, on a respective computing device, such as one or more of the servers 2220, 2240, 2260, and 2280 shown in FIG. 2.

The indexing coordination unit 4100 may obtain index configuration data for one or more indexes. For example, the indexing coordination unit 4100 may receive or otherwise access the index configuration data 4300. The index configuration data may include token type information, data source information, index distribution coordination information, or a combination thereof. For example, the token type information may indicate whether the tokens indexed by a respective index are ontological data tokens or constituent data tokens. Other token types may be used. The data source information may identify one or more sources of data, such as ontological data or constituent data, corresponding to the respective indexes. For example, data source information identifying a source of ontological data, which may include information for obtaining ontological data from the distributed in-memory ontology unit 3500 shown in FIG. 3. In another example, data source information identifying a source of constituent data may include information for obtaining the constituent data from the distributed in-memory database 3300 shown in FIG. 3. Other data sources, such as a usage data source, may be used. The data source information identifying a source of constituent data may include the information for obtaining corresponding ontological data. The index distribution coordination information may include information indicating one or more rules or constraints for organizing the indexes among the indexing operation units 4110, 4120, 4130. For example, the index distribution coordination information may include information indicating that an ontological data index may be included in each of the indexing operation units 4110, 4120, 4130.

Although not shown separately in FIG. 4, the indexing coordination unit 4100 may obtain indexing operation unit data indicating the configuration and status of the indexing operation units 4110, 4120, 4130. For example, the indexing coordination unit 4100 may receive, or otherwise access, the indexing operation unit data from a distributed cluster manager, such as the distributed cluster manager 3100 shown in FIG. 3.

Generating, maintaining, or operating an index may include may include generating one or more respective shard specifications. A shard specification may define the data source or sources for building an index shard. The shard specifications may be generated based on the constituent data, or corresponding sample data, for the index and a defined sharding strategy. The shard specifications may be stored in a shard specification repository, such as a shard specification repository in the low-latency database analysis system 3000 shown in FIG. 3. A shard specification may include a description of an index shard such that an indexing operation unit 4110, 4120, 4130 may generate, build, or load the index shard based on the shard specification. For example, a shard specification may include token type information, token stream information, range partitioning information, segment information, current (active) version information, target version information, or a combination thereof. The version information (current, target) may respectively include an integer version value, source information, or a combination thereof. The source information may include, for example, an indication of ontological data corresponding to the source and an indication of low-latency data stored in the distributed in-memory database, such as a column specification. The source information may include a post-partition value, which may indicate whether to partition tokens from obtained from the source to extract matching tokens. For example, partitioning may be omitted for previously partitioned tokens, such as tokens partitioned by the corresponding data-query, as indicated by the post-partition value. In some implementations, the shard specification may include or identify one or more data-query definitions for the index shard, such as a sampling data-query, which may be used to query the data source, such as the distributed in-memory database 3300 shown in FIG. 3, for sample data, such as sample tokens, from the constituent data corresponding to the index shard, an indexing data-query, which may be used to query the data source for data, such as tokens, from the constituent data corresponding to the index shard, or may include sampling data-queries and indexing data-queries.

For each index indicated in the index configuration data the indexing coordination unit 4100 may initiate, instantiate, or operate a respective index manager. The index managers may monitor the corresponding data source to identify updates or changes and may update the shard manager to create and distribute shards to represent the updated state of the data source. An index manager may be associated with a data source. For example, an index manager may be associated with the distributed in-memory database 3300 shown in FIG. 3. In some implementations, the index managers may identify and send one or more shard specifications for a respective index to the shard manager.

Although not shown separately in FIG. 4, the indexing unit 4000 may include one or more segment managers (or segment management units). For example, the indexing unit 4000 may include a segment manager corresponding to each respective index segment. Each segment manager may operate within a respective thread, which may be independent of other segment manager threads and may be independent of a thread for the indexing coordination unit 4100. In some implementations, the index manager for an index may identify the segments for the index and may instantiate a respective segment manager for each segment. In some implementations, the segment managers may identify and send one or more shard specifications for a respective index segment to the index manager for the corresponding index.

The shard manager may store shard specifications, such as shard specifications received from the index managers, shard binding, such as shard bindings identified by the indexing scheduler, shard status information, such as shard status information received from the respective index repositories 4112, 4122, 4132.

The indexing scheduler may distribute the shards among the indexing operation units 4110, 4120, 4130. The indexing scheduler may transmit, send, or otherwise make available, a sharding schedule, indicating bindings of shards to the indexing operation units 4110, 4120, 4130, to the shard manager.

The ontological manager may obtain ontological data, such as from the distributed in-memory ontology unit 3500 shown in FIG. 3. The ontological manager may transmit, send, or otherwise make available, the ontological data to the respective index managers. Although not shown expressly in FIG. 4, each of the indexing operation units 4110, 4120, 4130 may include a respective ontological data replica. The ontological manager may transmit, send, or otherwise make available, the ontological data to the respective ontological data replicas.

The ontological data may define or describe objects in the low-latency database analysis system, such as tables, columns, security groups, or any other object described herein or otherwise represented in the low-latency database analysis system, which may include identifying one or more properties of respective objects and may include describing relationships between respective objects. A token in the low-latency database analysis system may be annotated with ontological data identifying a respective parent object for the token. An object, such as a column, may be uniquely identified in the low-latency database analysis system by an integer value, such as a column index. A column index based bitmap may be used a as a compact representation of a set of columns. Traversing an index may include using the column index bitmaps. The ontological manager may manage a column index map for the low-latency database analysis system, which may include the allocation and reallocation of indices.

In some implementations, the indexing coordination unit 4100 may identify a change in the status or configuration of one or more of the indexing operation units 4110, 4120, 4130. For example, the indexing coordination unit 4100 may determine that one or more of the indexing operation units 4110, 4120, 4130 is unavailable. In response to identifying a change in the status or configuration of one or more of the indexing operation units 4110, 4120, 4130, the indexing coordination unit 4100 may regenerate and resend one or more indexing assignments to one or more of the indexing operation units 4110, 4120, 4130.

The indexing coordination unit 4100 may generate index organization, or layout, data indicating the organization of the respective portions of the indexes with respect to the indexing operation units 4110, 4120, 4130. The indexing coordination unit 4100 may generate and send one or more messages or signals indicating the index organization, or layout, data to one or more of the index searchers 4114, 4124, 4134. The indexing coordination unit 4100 may identify shard configuration information based on the index configuration information and the indexing operation unit data. For example, the shard configuration information may include one or more indexing data-queries that may be used to obtain tokens from the data source, such as from the low-latency data stored in the distributed in-memory database. A respective indexing operation unit 4110, 4120, 4130 may instantiate, build, generate, load, or operate a shard based on the shard configuration information for the shard.

In response to identifying a data source update, the indexing coordination unit 4100 may coordinate transitionally transitioning the shards from a current (active), pre-update, state to a target, post-update, state. The indexing coordination unit 4100 may pin one or more versions of a shard to implement the transition. For example, the indexing coordination unit 4100 may pin an active shard version, which may include information for generating the current state of the shard, and a target version, which may include information for generating the target state of the shard. In response to determining that target shards are available, the target versions may be identified as the active versions.

Each of the indexing operation units 4110, 4120, 4130 may include a respective index repository 4112, 4122, 4132, a respective index searcher 4114, 4124, 4134, or both. The indexing operation units 4110, 4120, 4130 may be similar to the secondary relational search unit instances described with respect to FIG. 3, except as described herein or otherwise clear from context.

An index repository 4112, 4122, 4132 may generate (build) or load one or more respective local (within the respective repository) indexes, or index portions, based on one or more indexing assignments, ontological data received from the indexing coordination unit 4100, or a combination thereof. An index repository 4112, 4122, 4132 may obtain constituent data from a data source, which may include obtaining tokens for a respective index.

An index searcher 4114, 4124, 4134 may receive a request for data, such as from a relational search unit, such as the relational search unit 3700 shown in FIG. 3. In some implementations, the relational search unit and the index searcher 4114, 4124, 4134 may be implemented on a respective logical or physical device. In some implementations, the relational search unit may send, transmit, or otherwise make available, a request for data to an index searcher 4114, 4124, 4134 on another logical or physical device. An index searcher 4114, 4124, 4134 may transmit, send, or otherwise make available, a request for data, or one or more portions thereof, to one or more shards of the corresponding index, which may be on one or more of the indexing operation units 4110, 4120, 4130. The index searcher 4114, 4124, 4134 may receive response data from respective shards, may aggregate or assemble the response data, and may transmit, send, or otherwise make available, the aggregated response data to the relational search unit.

An index query may use a consistent version across shards of an index. For example, a monotonically increasing integer version value may be assigned to a shard version and the respective index searcher 4114, 4124, 4134 may pin the shard version to distribute an index query among the index repository 4112, 4122, 4132.

The first indexing operation unit 4110 may include a first index repository 4112. The first indexing operation unit 4110 may receive an indexing assignment from the indexing coordination unit 4100. The first indexing operation unit 4110 may generate, build, or load one or more index portions in the first index repository 4112 in response to receiving, or otherwise accessing, the indexing assignment from the indexing coordination unit 4100. The first indexing operation unit 4110 may obtain token data for the index portion of the first index repository 4112, such as by sending a request for token data to the one or more sources for of constituent data corresponding to the indexes, such as the distributed in-memory database 3300 shown in FIG. 3. The first index repository 4112 may send, transmit, or otherwise make available, status information regarding the shards assigned to the first index repository 4112. The first index repository 4112 may implement an interface for searching the shards assigned to the first index repository 4112.

The second indexing operation unit 4120 may include a second index repository 4122. The second indexing operation unit 4120 may receive an indexing assignment from the indexing coordination unit 4100. The second indexing operation unit 4120 may generate, build, or load one or more index portions in the second index repository 4122 in response to receiving, or otherwise accessing, the indexing assignment from the indexing coordination unit 4100. The second indexing operation unit 4120 may obtain token data for the index portion of the second index repository 4122, such as by sending a request for token data to the one or more sources for of constituent data corresponding to the indexes, such as the distributed in-memory database 3300 shown in FIG. 3. The second index repository 4122 may send, transmit, or otherwise make available, status information regarding the shards assigned to the second index repository 4122. The second index repository 4122 may implement an interface for searching the shards assigned to the second index repository 4122.

The third indexing operation unit 4130 may include a third index repository 4132. The third indexing operation unit 4130 may receive an indexing assignment from the indexing coordination unit 4100. The third indexing operation unit 4130 may generate, build, or load one or more index portions in the third index repository 4132 in response to receiving, or otherwise accessing, the indexing assignment from the indexing coordination unit 4100. The third indexing operation unit 4130 may obtain token data for the index portion of the third index repository 4132, such as by sending a request for token data to the one or more sources for of constituent data corresponding to the indexes, such as the distributed in-memory database 3300 shown in FIG. 3. The third index repository 4132 may send, transmit, or otherwise make available, status information regarding the shards assigned to the third index repository 4132. The third index repository 4132 may implement an interface for searching the shards assigned to the third index repository 4132.

The first indexing operation unit 4110 may include a first index searcher 4114, the second indexing operation unit 4120 may include a second index searcher 4124, the third indexing operation unit 4130 may include a third index searcher 4134.

The index searchers 4114, 4124, 4134 may, respectively, distribute received index queries to relevant shards, such as based on shard layout information obtained from the indexing coordination unit 4100. The index searchers 4114, 4124, 4134 may obtain index search results data in response to distributing the index queries and may send, transmit, or otherwise make available the index search results data to the indexing coordination unit 4100.

Generating or regenerating an index may include compacting the index. Compacting an index may include merging the auxiliary index and the primary index and repartitioning the merged set of objects (tables). Generating or regenerating an index may include an indexing coordination unit, such as the indexing coordination unit 4100, coordinating one or more indexing operation units, such as the indexing operation units 4110, 4120, 4130. In some implementations, each indexing operation unit may correspond with a respective thread.

Figure 5:
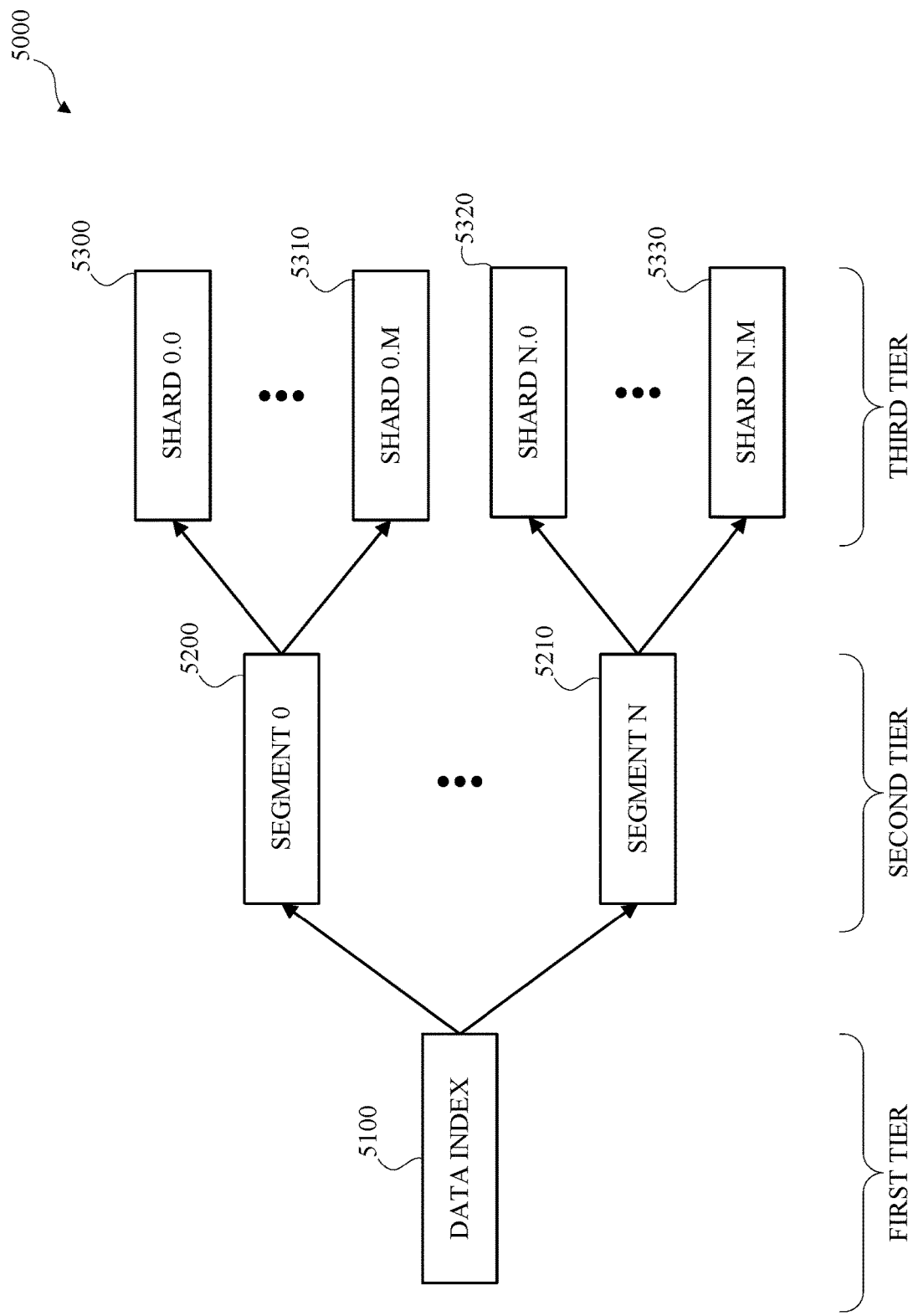
FIG. 5 is a block diagram of an example of a multi-tiered index segmentation and sharding scheme of a low-latency database analysis system.

FIG. 5 is a block diagram of an example of a multi-tiered index segmentation and sharding scheme 5000 of a low-latency database analysis system. The multi-tiered index segmentation and sharding scheme 5000 may be implemented in a low-latency database analysis system, such as the low-latency database analysis system 3000 shown in FIG. 3. For example, indexing unit, such as an indexing unit implemented by the relational search unit 3700 shown in FIG. 3, may implement the multi-tiered index segmentation and sharding scheme 5000, or a portion thereof.

The indexes, such as the ontological index, the constituent data index, or the usage index described with reference to the relational search unit 3700 shown in FIG. 3, may represent the internal data and the structure and organization thereof stored and used in the low-latency database analysis system 3000. Changes in the internal data that occur subsequent to generating, or regenerating, the indexes may be unrepresented in the indexes, which may reduce the accuracy and efficiency of the low-latency database analysis system 3000. One or more of the indexes, or respective portions thereof, may be updated or regenerated to represent changes occurring subsequent to the most recent preceding generation or regeneration of the respective index or index portion, which may maintain or improve the accuracy and efficiency of the low-latency database analysis system 3000. Generating an index, or regenerating an index, such as in response to a change of the corresponding data, may include substantial resource utilization, which may reduce the efficiency and utility of the low-latency database analysis system 3000.

In some implementations, one or more of the indexes, such as the ontological index, the constituent data index, or the usage index described with reference to the relational search unit 3700 shown in FIG. 3, may be implemented as a monolithic index. Regenerating a monolithic index in response to a change of the corresponding data, such as in response to a change of a table definition or in response to a change in row-level security configuration, may include relatively high resource utilization and latency (with respect to the index reflecting the change and to the accessibility of data corresponding to the change in the low-latency database analysis system 3000). The resource utilization for generating, or regenerating, a monolithic index may be proportional to size of the index (e.g., the amount of constituent data indexed).

Index segmentation, such as in the multi-tiered index segmentation and sharding scheme 5000, may reduce the resource utilization and latency of the low-latency database analysis system 3000, may improve the efficiency of the low-latency database analysis system 3000, and may maintain the accuracy of the low-latency database analysis system 3000 relative to a monolithic indexing scheme.

Generating, or regenerating, an index may include retrieving the constituent data, or a portion thereof, from the database. For example, the indexing unit may send one or more requests (indexing data-queries) to a source of the constituent data, such as the distributed in-memory database 3300 shown in FIG. 3, to identify the constituent data. Requesting the constituent data may include identifying the constituent data on a per-column basis. The indexing unit may generate an indexing data-query, such as a data-query in accordance with a defined structured query language associated with the data source, to identify unique tokens from a column of a table from the constituent data. In some implementations, the request for data may include a request for data from a complex database structure, such as a logical construct, formulae, or aggregation.

Index segmentation may include generating a set or collection of token streams. Each token stream may be associated with a respective column from the constituent data and may be based on a corresponding indexing data-query or sampling data-query. A token stream may be a data structure, unit, or container that includes information indicating a description of the set of constituent data represented by the token stream, such as an identifier of a column in the distributed in-memory database, and information for reading or otherwise obtaining the constituent data represented by the token stream, such as information indicating a file system path of a file including cached constituent data or defined data-query for requesting the constituent data from the distributed in-memory database. In some implementations, the token stream may include the constituent data. In some implementations, the indexing unit may store or persist one or more of the token streams. Index regeneration may include using one or more previously stored token streams. In some implementations, the indexing unit may update one or more token streams in response to identifying a change in the constituent data.

The multi-tiered index segmentation and sharding scheme 5000 shown in FIG. 5 includes a first tier, a second tier depending from the first tier, and a third tier depending from the second tier.

The first tier shows a data index 5100 and represents the constituent data indexed by the data index 5100 using the multi-tiered index segmentation and sharding scheme, such as a set of logical tables. For example, the set of logical tables may include a first table, a second table, a third table, and a fourth table (not shown).

The constituent data from the data index 5100 of the first tier, such as the set of logical tables, is partitioned into the second tier as disjoint subsets, or segments 5200, 5210. For example, the set of logical tables from the first tier may be partitioned into a defined cardinality (N) of segments (0-N), such as a first segment 5200 (segment 0) and an Nth segment 5210 (segment N) as shown. For example, the set of logical tables may include a first table, a second table, a third table, and a fourth table; the first table and the second table may be partitioned into the first segment 5200 (segment 0), and the third table and the fourth table may be partitioned into the nth segment 5210 (segment N). The cardinality of the set of segments may differ, as indicated by the ellipsis between the first segment 5200 and the Nth segment 5210. The segments 5200, 5210 may be versioned. The segments 5200, 5210 may be indexed atomically.

The segments 5200, 5210 in the second tier may be divided (or sharded), such as based on lexicographical range, into index shards in the third tier. For example, each segment 5200, 5210 may be sharded into a defined cardinality (M) of index shards 5300-5330 (shard 0.0-0.M, N.0-N.M). One or more index shards 5300-5330 may be implemented, such as stored, operated, or both, on a respective physical or logical device, for load balancing, distributed computing, or both.

For example, the set of logical tables may include a first table, a second table, a third table, and a fourth table; the first segment 5200 (segment 0) may include the first table and the second table, and the nth segment 5210 (segment N) may include the third table and the fourth table; the first shard 5300 of the first segment 5200 (shard 0.0) may include data from the first table and the second table in a first portion of the lexicographical range, such as the alphabetical range A-K, and the second shard 5310 of the first segment 5200 (shard 0.M) may include data from the first table and the second table in a second portion of the lexicographical range, such as the alphabetical range L-Z; the first shard 5320 of the nth segment 5210 (shard N.0) may include data from the third table and the fourth table in the first portion of the lexicographical range, such as the alphabetical range A-K, and the second shard 5330 (shard N.M) of the nth segment 5210 may include data from the third table and the fourth table in the second portion of the lexicographical range, such as the alphabetical range L-Z.

Figure 6:
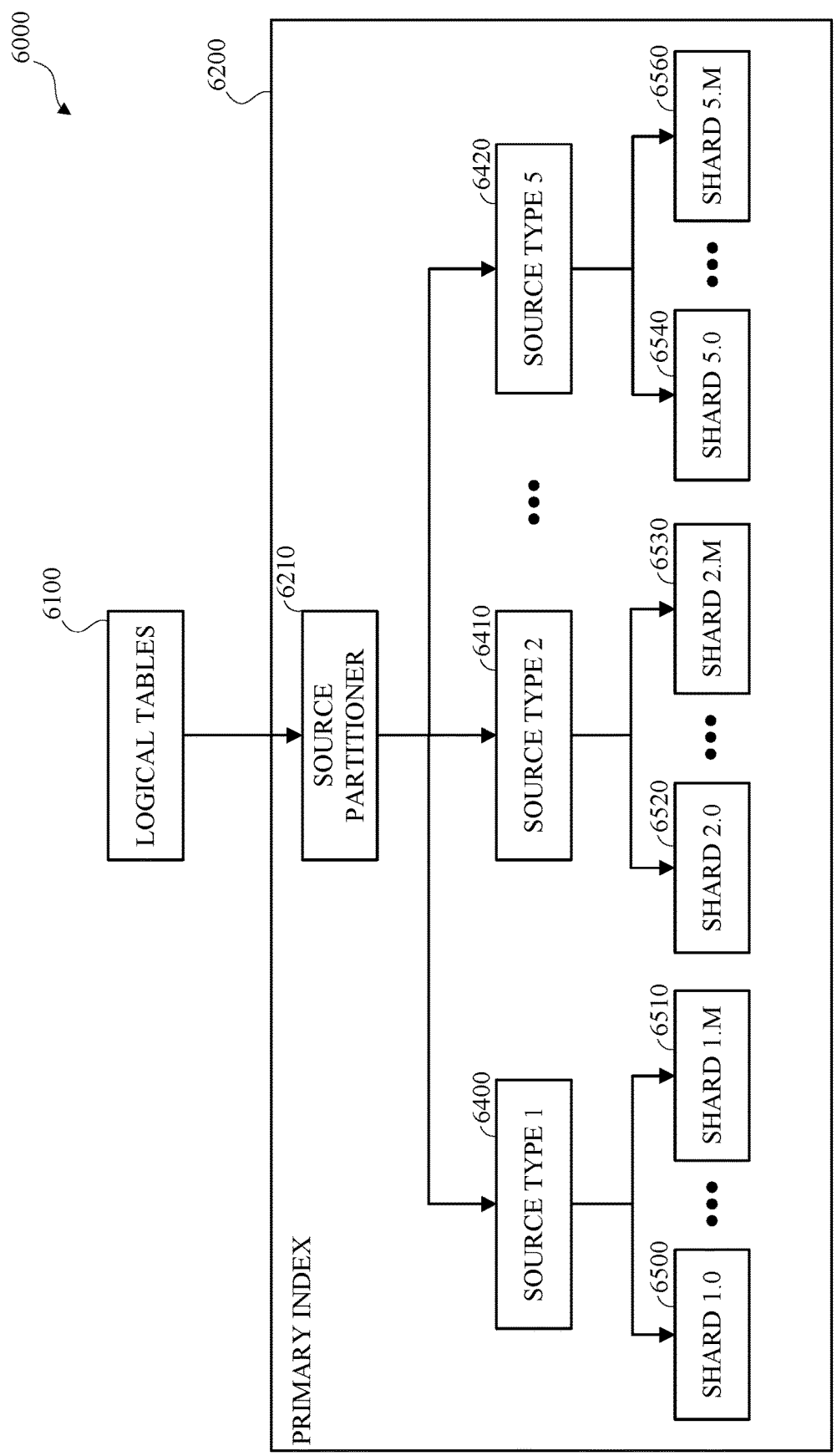
FIG. 6 is a block diagram of an example of a multi-tiered index segmentation and sharding scheme with source-partitioning of a low-latency database analysis system.

FIG. 6 is a block diagram of an example of a multi-tiered index segmentation and sharding scheme with source-partitioning 6000 of a low-latency database analysis system. The multi-tiered index segmentation and sharding scheme with source-partitioning 6000 may be implemented in a low-latency database analysis system, such as the low-latency database analysis system 3000 shown in FIG. 3. For example, an indexing unit, such as the relational search unit 3700 shown in FIG. 3, may implement the multi-tiered index segmentation and sharding scheme with source-partitioning 6000, or a portion thereof.

In some implementations, indexing may include segmenting, such as creating or generating segments, by grouping tables based on data source or data source type. For example, tables input, populated, or loaded into the low-latency database analysis system from a first source or having a first source type, such as enterprise relational database source type, may be segmented into a first index and tables input, populated, or loaded into the low-latency database analysis system from a second source or having a second source type, such as enterprise application data source type, may be segmented into a second index. Segmenting based on source type may generate a segment including a relatively large cardinality of tables (relative to the cardinality of tables in other segments), which may include relatively high resource, such as memory, utilization. For example, an out of memory condition may occur during generation or regeneration of large segments. Segmentation generating a relatively large segment may result in redundant reindexing of unchanged tokens, which may reduce the freshness of incremental updates to tables. Adding a previously unindexed table to an index including a relatively large segment may include rebuilding the relatively large segment, which may include high resource utilization.

FIG. 6 shows constituent data 6100 (logical tables) and a primary index 6200 for indexing the constituent data 6100. The primary index 6200 includes a source partitioner 6210 for partitioning the constituent data into segments based on source type. In the example shown in FIG. 6, the constituent data 6100 is partitioned into five segment (N=5) based on five source types, including a first segment 6400 based on a first source type (source type 1), a second segment 6410 based on a second source type (source type 2), a third segment based on a third source type (not shown), a fourth segment based on a fourth source type (now shown), and a fifth segment 6420 based on a fifth source type (source type 5).

The first segment 6400 is sharded into a first set of shards (Shard 1.0-Shard 1.M). In FIG. 6 a first shard 6500 of the first segment 6400 (shard 1.0) is shown, second through M−1th shards are not shown, and an Mth shard 6510 of the first segment 6400 (shard 1.M) is shown. The second segment 6410 is sharded into a second set of shards (Shard 2.0-Shard 2.M). In FIG. 6 a first shard 6520 of the second segment 6410 (shard 2.0) is shown, second through M−1th shards are not shown, and an Mth shard 6530 of the second segment 6410 (shard 2.M) is shown. The third segment is sharded into a third set of shards (not shown). The fourth segment is sharded into a fourth set of shards (not shown). The fifth segment 6420 is sharded into a fifth set of shards (Shard 5.0-Shard 5.M). In FIG. 6 a first shard 6540 of the fifth segment 6420 (shard 5.0) is shown, second through M−1th shards are not shown, and an Mth shard 6560 of the fifth segment 6420 (shard 5.M) is shown.

Figure 7:
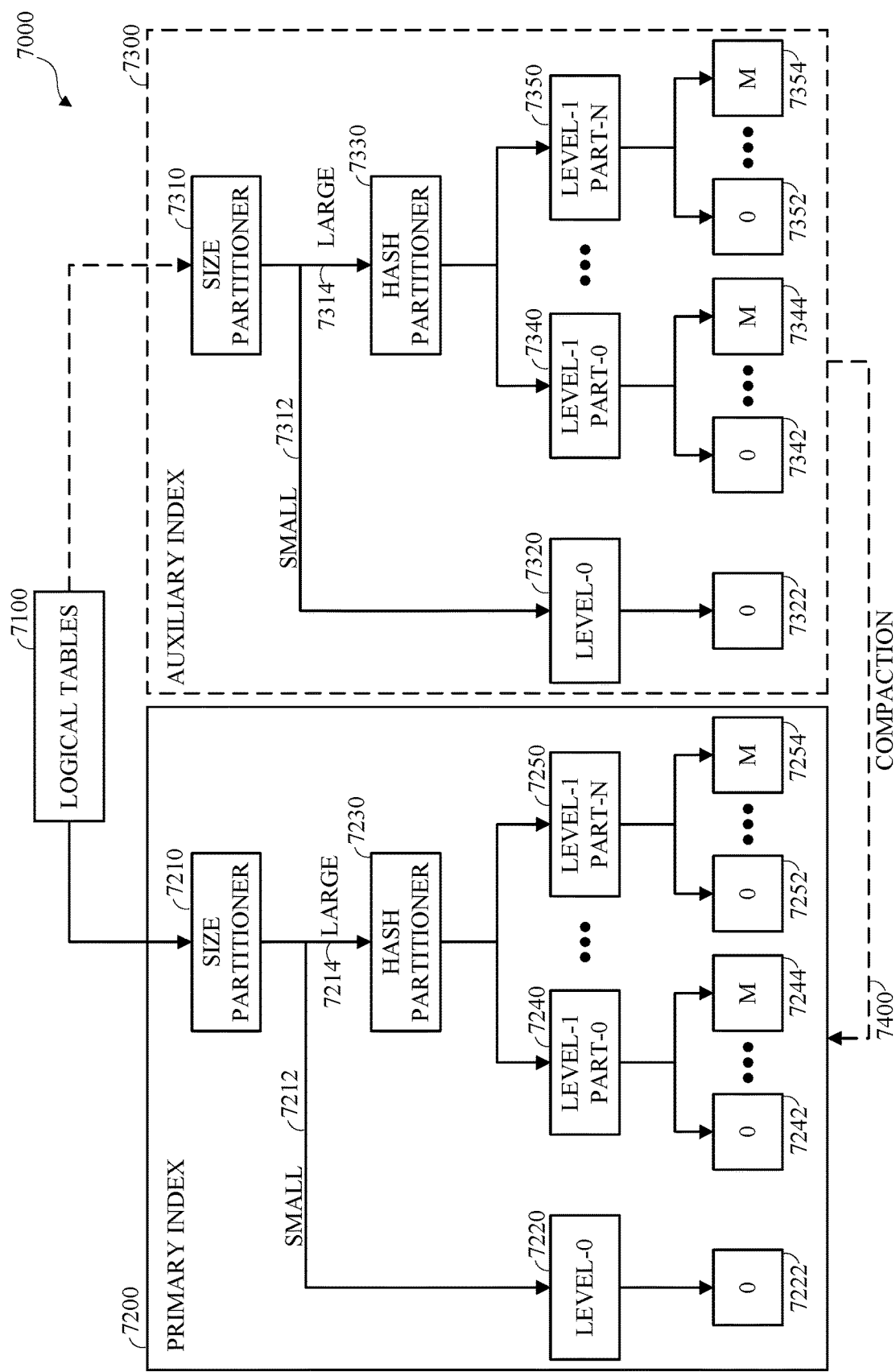
FIG. 7 is a block diagram of an example of a multi-tiered index segmentation and sharding scheme of a low-latency database analysis system with dynamic-partitioning, auxiliary indexing, and periodic compaction.

FIG. 7 is a block diagram of an example of a multi-tiered index segmentation and sharding scheme 7000 of a low-latency database analysis system with dynamic-partitioning, auxiliary indexing, and periodic compaction. The multi-tiered index segmentation and sharding scheme 7000 may be implemented in a low-latency database analysis system, such as the low-latency database analysis system 3000 shown in FIG. 3. For example, an indexing unit, such as the relational search unit 3700 shown in FIG. 3, may implement the multi-tiered index segmentation and sharding scheme 7000, or a portion thereof.

Using the multi-tiered index segmentation and sharding scheme 7000 may reduce the risk of an out of memory error, relative to other sharding schemes, such as the multi-tiered index segmentation and sharding scheme with source partitioning 6000 shown in FIG. 6. For example, the risk of an out of memory error may be evaluated based on a memory resource utilization metric, such as combined maximum peak random access memory utilization during index building. Using the multi-tiered index segmentation and sharding scheme 7000 may improve incrementality, such as by improving freshness of updates to tables, relative to other segmentation and sharding schemes, such as the multi-tiered index segmentation and sharding scheme with source partitioning 6000 shown in FIG. 6.

Improvements in incrementality may be evaluated based on one or more metrics. A first metric may represent an average time (x) to index updates to tables previously indexed by the primary index, which may be expressed as the following:

$$x = \frac{1}{\text{count(tables)}} \sum_{s \in segments} (\text{time to index } s)(\text{count(tables in } s)).$$

A second metric may represent an average time to index previously unindexed table data, which may be expressed as a temporal span between an earliest temporal point or location corresponding to inputting, populating, or loading previously unindexed table data into the low-latency database analysis system and a latest temporal point or location corresponding to availability of the corresponding data for index-based access in the low-latency database analysis system.

Using the multi-tiered index segmentation and sharding scheme 7000 may avoid the introduction of regressions, which may be evaluated based on average index build time, which may include a cumulative or aggregate generation, or regeneration time span for the segments of the index. Using the multi-tiered index segmentation and sharding scheme 7000 may be flag controllable and extendable.

FIG. 7 shows constituent data 7100 (logical tables), a primary index 7200, and an auxiliary index 7300. In an index implementing multi-tiered index segmentation and sharding scheme 7000 the constituent data 7100 may be partitioned based on one or more characteristics of the constituent data 7100 to determine optimal partitions. For simplicity and clarity, partitioning the constituent data by table based on table size as a primary characteristic is described herein. Other logical and physical constructs, or combinations thereof, such as formulae or aggregated worksheets, and other characteristics, or combinations of characteristics, may be used.

The primary index 7200 includes a size partitioner 7210. The size partitioner 7210 partitions the constituent data 7100 into a first partition 7212 and a second partition 7214 based on the size of the respective tables. Small tables, such as tables having a size below (less than) a defined threshold size, may be partitioned into the first partition 7212 and large tables, such as tables having a size exceeding (equal to or greater than) the defined threshold, may be partitioned into the second partition 7214. For example, relatively many, such as 90%, of the logical tables may be small tables and relatively few, such as 10%, of the logical tables may be large tables. Table size may be a measure of the number, or cardinality, of unique indexable tokens in the table. Other metrics of table size may be used.

The tables partitioned into the first partition 7212 (many small tables) may be included in a first segment 7220 (level-0). The constituent data in the first segment 7220 (level-0) of the first partition 7212 may be sharded into a first shard 7222 (0). The cardinality of the set of shards for the first segment 7220 may be limited based on a defined maximum, such as to a maximum of one shard. The cardinality of the set of tokens included in the first segment 7220 may be limited based on a defined maximum, such as to a maximum of one million tokens.

The primary index 7200 includes a hash partitioner 7230. The tables partitioned into the second partition 7214 (few large tables) may be partitioned by the hash partitioner 7230 into a set of segments 7240, 7250, which may have a defined cardinality (N), such as in the range from 1-8. Each of the segments 7240, 7250 from the second partition 7214 may include a defined cardinality (M) of shards. The cardinality of the set of tokens in the second partition 7214 may be on the order of ten million tokens per segment. FIG. 7 shows a first segment 7240 (level-1.part-0) including M shards 7242-7244 and an N'th segment 7250 (level-1.part-N) including M shards 7252-7254.

The auxiliary index 7300 includes a size partitioner 7310, a first partition 7312 including a first segment 7320 including a first shard 7322, a hash partitioner 7330, a second partition 7314 including a set of N segments 7340, 7350 each including a set of M shards 7342-7344 and 7352-7354 respectively. The size partitioner 7310 of the auxiliary index 7300 may be similar to the size partitioner 7210 of the primary index 7200, except as described herein or otherwise clear from context. The first partition 7312 of the auxiliary index 7300 may be similar to the first partition 7212 of the primary index 7200, except as described herein or otherwise clear from context. The first segment 7320 of the auxiliary index 7300 may be similar to the first segment 7220 of the primary index 7200, except as described herein or otherwise clear from context. The first shard 7322 of the first segment 7320 of the auxiliary index 7300 may be similar to the first shard 7222 of the first segment 7220 of the primary index 7200, except as described herein or otherwise clear from context. The hash partitioner 7330 of the auxiliary index 7300 may be similar to the hash partitioner 7230 of the primary index 7200, except as described herein or otherwise clear from context. The segments 7340, 7350 of the second partition 7314 of the auxiliary index 7300 may be similar to the segments 7240, 7250 of the second partition 7214 of the primary index 7200, except as described herein or otherwise clear from context. The shards 7342-7344 and 7352-7354 of the segments 7340, 7350 of the second partition 7314 of the auxiliary index 7300 may be similar to the shards 7242-7244 and 7252-7254 of the segments 7340, 7350 of the second partition 7214 of the primary index 7200, except as described herein or otherwise clear from context.

Constituent data 7100, such as logical tables, previously unindexed, such as tables included in the constituent data 7100 subsequent to generating the primary index 7200, subsequent to a most recent regeneration of the primary index 7200, or subsequent to a most recent compaction of the index, may be indexed in the auxiliary index 7300. The auxiliary index 7300 may be compacted into the primary index 7200, such as periodically (periodic event), such as on an eight-hour periodic schedule, as indicated by the broken directional line at 7400. In some implementations, the auxiliary index 7300 may be compacted into the primary index 7200 in response to another event, such as receiving input, such as user input, indicating a request to compact.

The shards 7222, 7242-7244, 7252-7254, 7322, 7342-7344, 7352-7354 may be respectively distinct and distinguishable, and may be collectively operatively identified as the corresponding segments 7220, 7240, 7250, 7320, 7340, 7350. The segments 7220, 7240, 7250, 7320, 7340, 7350 may be respectively distinct and distinguishable, and may be collectively operatively identified as the primary index 7200 or the auxiliary index 7300 respectively. The primary index 7200 and the auxiliary index 7300 may be respectively distinct and distinguishable and may be collectively operatively identified as a unified index.

Figure 8:
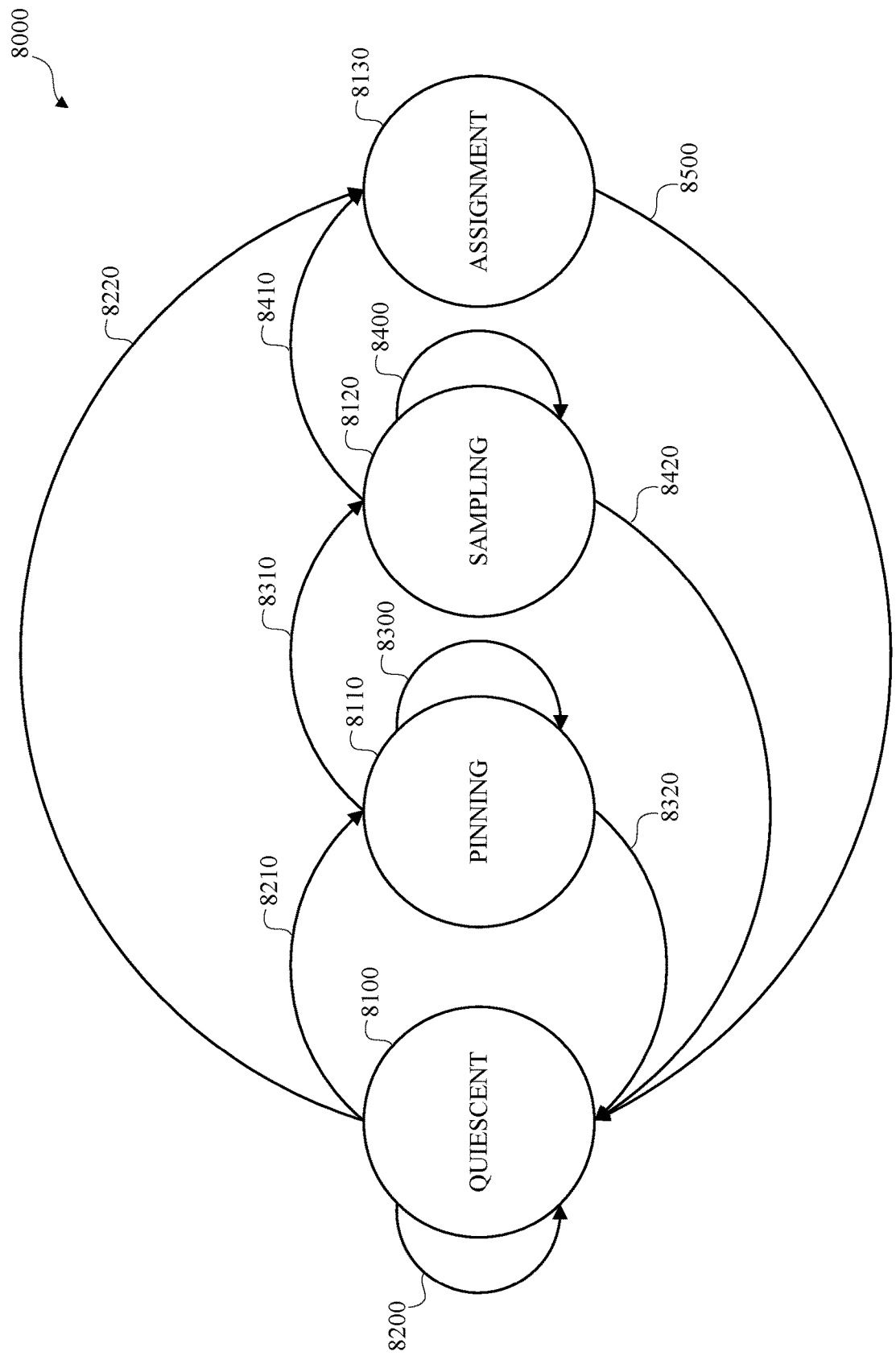
FIG. 8 is a diagram of an example of an indexing finite state machine of a low-latency database analysis system for multi-tiered index segmentation and sharding with dynamic-partitioning, auxiliary indexing, and periodic compaction.

FIG. 8 is a diagram of an example of an indexing finite state machine 8000 of a low-latency database analysis system for multi-tiered index segmentation and sharding with dynamic-partitioning, auxiliary indexing, and periodic compaction. The indexing finite state machine 8000 implements aspects of an assignment build workflow for generating, or regenerating, an index, which may correspond with indexing, or reindexing, the corresponding constituent data, in accordance with a multi-tiered index segmentation and sharding scheme with dynamic-partitioning, auxiliary indexing, and periodic compaction, such as the multi-tiered index segmentation and sharding scheme 7000 shown in FIG. 7. For example, the indexing finite state machine 8000 may be implemented by an indexing unit, such as the relational search unit 3700 shown in FIG. 3, or the indexing coordination unit 4100 shown in FIG. 4. Although not expressly shown, the indexing unit, or a portion thereof, such as the indexing coordination unit 4100 shown in FIG. 4, may include one or more segmentation assigners (or segmentation assignment units). A segmentation assigner may be associated with a corresponding index manager.

Indexing, such as generating or regenerating an index, may be performed in accordance with one or more defined segmentation strategies, such as a segmentation strategy from a set of available segmentation strategies, which may include one or more of a source-segmentation strategy, a uniform-segmentation strategy, and a build-optimized-segmentation strategy. Other segmentation strategies, or sets thereof, may be used.

The source-segmentation strategy may be similar to the multi-tiered index segmentation and sharding scheme with source-partitioning 6000 shown in FIG. 6, except as described herein or otherwise clear from context. For example, implementing the source-segmentation strategy may include using one or more source partitioners, such as the source partitioner 6210 shown in FIG. 6, for partitioning the constituent data into segments based on source type.

The uniform-segmentation strategy may be similar to the multi-tiered index segmentation and sharding scheme 7000 shown in FIG. 7, except as described herein or otherwise clear from context. For example, implementing the uniform-segmentation strategy may include using one or more hash partitioners, such as one or more of the hash partitioners 7230, 7330 shown in FIG. 7, for partitioning the constituent data into segments based on hashing. The uniform-segmentation strategy may omit characteristic (e.g., table size) based partitioning. For example, the uniform-segmentation strategy may omit using a size partitioner. The uniform-segmentation strategy may maximize uniformity of tokens per segment. The uniform-segmentation strategy may optimize load balancing for distributed indexing, which may correspond with reduced update freshness relative to the build-optimized-segmentation strategy. The uniform-segmentation strategy may include segmenting the constituent data into a variable number, or cardinality, of segments. Each segment may be associated with a defined optimal segment size, which may represent an optimal cardinality of the set of tokens included in the respective segment, such as ten million tokens. In some implementations, the defined optimal segment size may be configurable.

The build-optimized-segmentation strategy may be similar to the multi-tiered index segmentation and sharding scheme 7000 shown in FIG. 7, except as described herein or otherwise clear from context. For example, the build-optimized-segmentation strategy may include a combination of characteristic (e.g., table size) based partitioning and hash-based partitioning. Implementing the build-optimized-segmentation strategy may include using one or more size partitioners, such as one or more of the size partitioners 7210, 7310 shown in FIG. 7, to partition the constitute data into two or more partitions based on tables size, and using one or more hash partitioners, such as one or more of the hash partitioners 7230, 7330 shown in FIG. 7, for partitioning one or more of the size based partitions into segments based on hashing.

A segmentation strategy may be identified for a unified index, or respectively for a primary index of the unified index and for an auxiliary index of the unified index. In some implementations, the respective segmentation strategies may be configurable, which may include using a default segmentation strategy, which may be the build-optimized-segmentation strategy.

Indexing, such as generating or regenerating an index, may include identifying index configuration data, ontological data, or both and generating or regenerating the index based on the index configuration data, ontological data, or both. For example, the indexing unit, or the index manager, may obtain the index configuration data, the ontological data, or both and may generate, build, or load one or more indexes based on the configuration data, the ontological data, or both. The indexing unit, or the index manager, may reindex, such as regenerate or rebuild, one or more indexes or one or more portions thereof. The indexing unit, or the index manager, may instantiate, load, or operate one or more index managers, such as one index manager for each index. The index manager for an index may instantiate, load, or operate the indexing finite state machine 8000 for indexing data associated with the corresponding index, such as by generating, building, or loading the index. The index configuration data for an index may indicate a data source containing constituent data. The index may index the constituent data or a portion thereof.

As shown in FIG. 8, the indexing finite state machine 8000 includes a quiescent state 8100, a pinning state 8110, a sampling state 8120, and an assignment state 8130. In some implementations, the indexing finite state machine 8000 may include other states, such as an unpinning state (not shown).

The quiescent state 8100 may indicate a current absence of detected unindexed data, such as the absence of detected or identified updates or modifications to the constituent data, and may correspond with monitoring the constituent data for updates, modifications, or changes. The indexing finite state machine 8000 may be in the quiescent state 8100. For example, the indexing finite state machine 8000 may initiated or entered in the quiescent state 8100.

The indexing finite state machine 8000 may transition from the quiescent state 8100 to the quiescent state 8100, as indicated by the directional line at 8200, which may represent monitoring the constituent data for unindexed data, such as updates, modifications, or changes, and the absence thereof.

The indexing finite state machine 8000 may transition from the quiescent state 8100 to the pinning state 8110, as indicated by the directional line at 8210, such as in response to detecting or identifying unindexed data, such as an update, modification, or change of the constituent data or otherwise identifying a portion of the constituent data as unindexed data, and in accordance with the uniform-segmentation strategy, the build-optimized-segmentation strategy, or a combination thereof.

The indexing finite state machine 8000 may transition from the quiescent state 8100 to the assignment state 8130, as indicated by the directional line at 8220, such as in response to detecting or identifying unindexed data, such as an update, modification, or change of the constituent data, and in accordance with the source-segmentation strategy.

The pinning state 8110 may correspond with, or represent, generating and sending a pinning request message indicating a request to pin a table (requested pinning operation), such as by sending, transmitting, or otherwise making available, the pinning request message to the data source, such as to the distributed in-memory database 3300 shown in FIG. 3. For example, in response to transitioning from the quiescent state 8100 to the pinning state 8110 in accordance with identified unindexed data, such as one or more identified updates, modifications, or changes of the constituent data, corresponding to one or more identified tables, the indexing unit, or the index manager, may generate and send, transmit, or otherwise make available, a pinning request message to the data source. The pinning request message may indicate a request to pin one or more database objects, such as tables.

The data source may receive the pinning request and may pin, or execute a pinning operation for, the constituent data or tables indicated in the pinning request. In response to, or subsequent to, the pinning operation, the data source may generate and send, transmit, or otherwise make available, a pinning status message or response indicating a status of the pinning operation to the indexing unit or the index manager.

The pinning state 8110 may correspond with, or represent, identifying a pinning status corresponding to the pinning request. Identifying the pinning state may include receiving a pinning response message, such as from the data source. For example, the indexing unit, or the index manager, may receive the pinning response message in response to sending the pinning request message. The pinning response message may indicate a pinning status corresponding to the pinning request, such as a success status indicating that the table or tables indicated in the pinning request are pinned, or a failure status indicating a failure of the requested pinning operation.

The indexing finite state machine 8000 may transition from the pinning state 8110 to the pinning state 8110, as indicated by the directional line at 8300, such as subsequent to sending a request to pin a table to the data source and prior to the identification of a pinning status corresponding to the request to pin the table.

The indexing finite state machine 8000 may transition from the pinning state 8110 to the sampling state 8120, as indicated by the directional line at 8310, such as subsequent to successful pinning, such as subsequent to, or in accordance with, identifying the pinning status corresponding to the pinning request as the pinning success status. The pinning success status may indicate that the constituent data stored in the table or tables indicated in the pinning request concurrent with pinning the respective table or tables is identified as a defined set of available pinned data for the respective table such that changes to the constituent data stored in the table or tables indicated in the pinning request subsequent to identifying the defined set of available pinned data do not alter the set of available pinned data for the respective table.

The indexing finite state machine 8000 may transition from the pinning state 8110 to the quiescent state 8100, as indicated by the directional line at 8320, such as subsequent to, or in response to, a pinning failure, such as subsequent to, or in accordance with, identifying the pinning status corresponding to the pinning request as the pinning failure status. The pinning failure status may indicate that a defined set of available pinned data for one or more tables indicated by the pinning request is currently unavailable. For example, an in-memory database instance or unit of the distributed in-memory database may be unavailable, such as temporarily unavailable, concurrent with the pinning request and the pinning request may fail indicating that the portion of the constituent data contained within the unavailable in-memory database instance or unit is unavailable for pinning.

The sampling state 8120 may correspond with, or represent, generating and sending one or more sampling data-queries to the data source. For example, in response to transitioning from the pinning state 8110 to the sampling state 8120 subsequent to pinning the table or tables associated with the unindexed data, the indexing unit, or the index manager, may generate or obtain one or more sampling data-queries. A sampling data-query, or sample data data-query, may be used to query the constituent data for sample data. The indexing unit, or the index manager, may send, transmit, or otherwise make available, one or more requests, such as requests indicating the sampling data-queries, to the data source. In some implementations, the indexing may be reindexing, such as in response to one or more identified updates, modifications, or changes of the constituent data and the sampling data-queries may indicate the added or modified data portions.

The data source may execute the respective sampling data-queries, generate response data, such as sampling data, and may store the response data in a distinct indexing-optimized data-structure, distinct from the data source (e.g., distinct from the distributed in-memory database 3300 shown in FIG. 3), such as in a distributed file system.

For example, a sampling data-query may indicate a request for a defined maximum cardinality of unique or distinct rows, or tokens, from a column of a table. The data source may randomly, or pseudo-randomly, select, identify, or otherwise obtain, a sampling result set of unique or distinct rows or tokens, the sampling result set having a cardinality within the defined cardinality. The data source may include a sampling ratio indicating a ratio, or an approximation thereof, of the sampling result set to the cardinality of the sampled object in the response data. In some implementations, the request may omit the cardinality, the data source may determine the cardinality of a data portion, such as of a column, and the data source may indicate the cardinality in the response data.

The pinning state 8110 may correspond with, or represent, receiving or otherwise accessing the sample data. For example, the indexing unit, or the index manager, may receive, or otherwise access, the response data, such as the sampling data, such as by reading the response data from the indexing-optimized data-structure in the distributed file system.

The indexing unit, or the index manager, may generate object-level statistics, such as table-level statistics or column-level statistics, based on the sample data. For example, the object-level statistics may include a cardinality of a the unique indexable tokens corresponding to a respective table or column, average token length, or other information about the database object that may be identified by evaluating that sample data. The indexing unit, or the index manager, may include the object-level statistics with the sample data.

The indexing finite state machine 8000 may transition from the sampling state 8120 to the sampling state 8120, as indicated by the directional line at 8400, such as subsequent to sending the sampling data-queries to the data source and prior to the receiving sample data.

The indexing finite state machine 8000 may transition from the sampling state 8120 to the assignment state 8130, as indicated by the directional line at 8410, such as subsequent to receiving the sample data. In some implementations, the indexing finite state machine 8000 may transition from the sampling state 8120 to the assignment state 8130 in response to a determination that the sampling data satisfies a defined metric, such as a defined success metric. For example, obtaining the sample data may include obtaining execution status information corresponding to the sampling data-queries, such as information indicating successful execution of one or more of the sampling data-queries, or one or more portions thereof, information indicating an execution failure for one or more of the sampling data-queries, or one or more portions thereof, or a combination thereof. The indexing unit, or the index manager, may evaluate the execution status information to determine whether a successful execution metric exceeds, such as is greater than, a defined minimum sampling threshold, and the indexing finite state machine 8000 may transition from the sampling state 8120 to the assignment state 8130 in response to a determination that the received sampling data indicates a successful execution metric that exceeds, such as is greater than, the defined minimum sampling threshold.

The indexing finite state machine 8000 may transition from the sampling state 8120 to the quiescent state 8100, as indicated by the directional line at 8420, such as subsequent to, or in response to, a determination that the received sampling data indicates an execution metric that is within, such as equal to or less than, the defined minimum sampling threshold. In some implementations, the indexing finite state machine 8000 may transition from the sampling state 8120 to the quiescent state 8100, as indicated by the directional line at 8420, in response to receiving or detecting an indication of an error, such as a sampling error, or in response to an event, such as the expiration of a defined temporal span.

The assignment state 8130 may correspond with, or represent, generating and sending one or more assignment requests to a segmentation assigner, or the index manager. For example, in response to transitioning from the sampling state 8120 to the assignment state 8130 subsequent to obtaining sampling data the indexing unit, or the index manager, may generate and send one or more segmentation assignment requests to the segmentation assigner. The segmentation assignment request may indicate the objects, such as tables, associated with the index. The segmentation assignment request may indicate a maximum cardinality of segments for the index. The segmentation assignment request may indicate a segmentation strategy for the index.

The segmentation assigner may generate logical table segment assignments. The segmentation assigner may define the primary index, the auxiliary index, or both. The segmentation assigner may manage the replication of tables on multiple segments to maintain availability when tables are moved between segments. The segmentation assigner may generate the logical table segment assignments based on an identified segmentation strategy. Generating the logical table segment assignments may include assigning logical tables, such as from a set of logical tables, to respective segments. Generating the logical table segment assignments may include generating or instantiating one or more segment partitioners.

A segment partitioner may determine segment partitioning information based on a defined set of objects, such as tables, which may include using state information for the objects. An instance of a segment partitioner may include one or more instances of segment partitioners (children). The instance of the segment partitioner may be a source partitioner, a hash partitioner, or a size partitioner. Other segment partitioners may be used.

The source partitioner may partition objects (tables) based on data origin. For example, the source partitioner may be similar to the source partitioner 6210 shown in FIG. 6.

The size partitioner may partition objects (tables) based on object (table) size. For example, the size partitioner may be similar to the size partitioner 7210, 7310 shown in FIG. 7. In an example, the size partitioner may partition objects (tables) by including objects (tables) in a first partition, such as a small partition, up to a defined maximum cardinality of tokens for the partition and may partition the objects (tables) omitted from the first partition into another partition, such as a large partition, which may omit an express maximum size. The size partitioner may identify a maximum cardinality of tokens for a first partition. The size partitioner may sort the objects (tables) by size, such as in size ascending order. The size partitioner may partition each unpartitioned object (table) from the set of sorted objects (tables), such as in size ascending order. For a current object (table), such as the smallest unpartitioned object from the set of sorted objects, the size partitioner may determine whether a current size of the first partition is less than the maximum size. For example. the size partitioner may determine that the current size of the first partition is less than the maximum size, the size partitioner may increase the current size of the first partition based on the size of the current table, and the size partitioner may assign the current table to the first partition. In response to determining that the current size of the first partition is equal to or greater than the maximum size, the size partitioner may assign the unpartitioned objects (tables) to a second partition. The objects partitioned into the first partition may be segmented into a first segment of the first partition. The objects segmented into the first segment of the first partition may be sharded into a first shard of the first segment of the first partition.

The hash partitioners may segment objects (tables) uniformly, such as into a cardinality of segments identified based on the lesser of a defined maximum cardinality of segments for the partition or a quotient of dividing a sum of the sizes of the tables for the partition by a defined maximum segment size. The sum of the sizes of the tables may be a cardinality of the tokens in the tables. The defined maximum segment size may be a defined cardinality of tokens per segment. For example, the hash partitioner may partition the objects partitioned into the second partition by the size segmented. For example, the hash partitioner may be similar to the hash partitioner 7230, 7330 shown in FIG. 7. In some implementations, hash partitioning may include Consistent Hashing.

The assignment state 8130 may correspond with, or represent, receiving one or more indexing segmentation assignments, such as from the segmentation assigner.

In response to receiving an indexing segmentation assignment the index manager may create, instantiate, or operate a segment manager, such as one of the segment managers described with respect to FIG. 4, for each respective segment indicated in the indexing segmentation assignment. The index manager may send, transmit, or otherwise make available, the indexing segmentation assignment, or a portion thereof corresponding to a segment, to the segment manager for the respective segment.

The segment manager for an index segment may generate, or otherwise obtain, one or more shard specifications for the index segment. For example, with respect to the primary index 7200 shown in FIG. 7, the index manager for the primary index 7200 may instantiate a segment manager for the first segment 7220 and the segment manager for the first segment 7220 may generate, or otherwise obtain, a shard specification for the first shard 7222. The index manager for the primary index 7200 may instantiate a respective segment manager for the each of the segments 7240-7250 of the second partition 7214, and the respective segment manager for the segments 7240-7250 of the second partition 7214 may generate, or otherwise obtain, a respective shard specification for each of the respective corresponding shards 7242-7244, 7252-7254.

The segment manager may generate or obtain one or more constituent data-queries. A constituent data-query, or indexing data-query, may be used to query the data source for data, such as tokens, from the constituent data corresponding to the index shard.

The segment manager may send, transmit, or otherwise make available, one or more requests, such as requests indicating the constituent data-queries, to the data source. In some implementations, the indexing may be reindexing, such as in response to one or more identified updates, modifications, or changes of the constituent data and the constituent data-queries may indicate the added or modified data portions.

The data source may execute the respective constituent data-queries, generate response data, such as constituent data, and may store the response data in a distinct indexing-optimized data-structure, distinct from the data source (e.g., distinct from the distributed in-memory database 3300 shown in FIG. 3), such as in a distributed file system.

The segment managers may send, transmit, or otherwise make available, the shard specifications to the index manager for the corresponding index.

FIG. 8 omits a directed line representing the indexing finite state machine 8000 transitioning from the assignment state 8130 to the assignment state 8130, which may indicate that the assignment state 8130 may be a blocking state. For example, the indexing unit, or the index manager, may be configured for multi-threaded execution wherein one or more aspects of index generation, such as aspects performed in accordance with the pinning state 8110 and aspects performed in accordance with the sampling state 8120, may be performed, or partially performed, using a non-blocking, or background, thread or process, concurrent, or substantially concurrent with other non-blocking aspects of index generation.

The indexing finite state machine 8000 may transition from the assignment state 8130 to the quiescent state 8100, as indicated by the directional line at 8500, such as subsequent to, or in response to, receiving one or more segmentation assignments, such as from the segmentation assigner.

Figure 9:
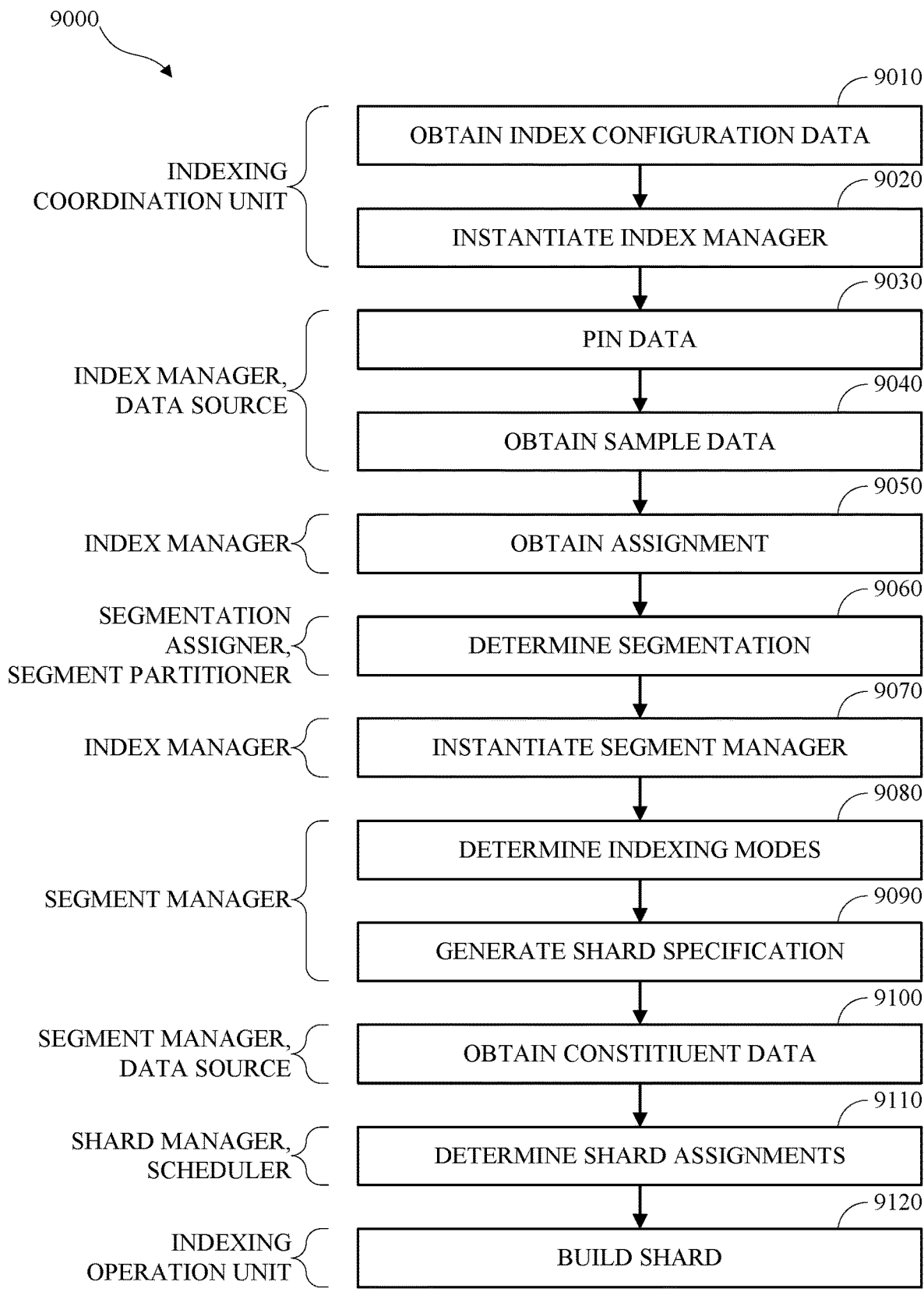
FIG. 9 is a flow diagram of an example of indexing in a low-latency database analysis system.

FIG. 9 is a flow diagram of an example of indexing 9000 in a low-latency database analysis system. Indexing 9000, such as generating or regenerating an index, in a low-latency database analysis system, such as the low-latency database analysis system 3000 shown in FIG. 3, may include indexing, or reindexing, the corresponding constituent data, in accordance with a multi-tiered index segmentation and sharding scheme with dynamic-partitioning, auxiliary indexing, and periodic compaction, such as the multi-tiered index segmentation and sharding scheme 7000 with dynamic-partitioning, auxiliary indexing, and periodic compaction shown in FIG. 7. For example, indexing 9000 may be implemented by an indexing unit, such as the relational search unit 3700 shown in FIG. 3, or the indexing unit 4000 shown in FIG. 4, which may include implementing the indexing finite state machine 8000 shown in FIG. 8.

Indexing 9000 may include obtaining index configuration data at 9010, instantiating an index manager at 9020, pinning data at 9030, obtaining sample data at 9040, obtaining an indexing assignment at 9050, determining index segmentation at 9060, instantiating a segment manager at 9070, determining indexing modes at 9080, generating shard specifications at 9090, obtaining constituent data at 9100, determining shard assignments at 9110, building shards at 9120, or a combination thereof.

Index configuration data may be obtained at 9010. For example, the index configuration data may be obtained at 9010 in accordance with initiating the low-latency database analysis system or in response to detecting or identifying unindexed data, such as an update, modification, or change of the constituent data or otherwise identifying a portion of the constituent data as unindexed data. An indexing coordination unit, such as the indexing coordination unit 4100 shown in FIG. 4, may obtain index configuration data for one or more indexes. The index configuration data may include token type information, data source information, index distribution coordination information, or a combination thereof.

Obtaining the index configuration data at 9010 may include obtaining ontological data. For example, the indexing coordination unit may obtain the ontological data, such as from an ontological data source, such as the distributed in-memory ontology unit 3500 shown in FIG. 3. The ontological data source may be identified by the index configuration data. The ontological data may define or describe the operative ontological structure or schema of the low-latency database analysis system, which may include describing attributes, properties, states, or other information about respective objects, such as tables, columns, security groups, or any other object described herein or otherwise represented in the low-latency database analysis system, and may include describing relationships among respective objects. In some implementations, an ontological manager associated with the indexing coordination unit may obtain the ontological data from the ontological data source.

In some implementations, the indexing coordination unit may receive, or otherwise access, a notification indicating a change of the ontology, such as from a semantic interface unit, such as the semantic interface unit 3600 shown in FIG. 3. The indexing coordination unit may generate and send, or otherwise make available, a request for information describing changes to the ontology (ontological updates request), such as to the semantic interface unit.

The indexing coordination unit may, responsive to the request for ontological updates, receive, or otherwise access, a response message or signal (ontological updates response), such as from the semantic interface unit, indicating the changes to the ontology. The ontological updates response may include information describing the ontological changes, such as the added or modified data portions, which may include one or more data-query definitions for each data portion identified for indexing in the ontological updates response, such as a sample data-query, which may be used to query the data source, such as from the distributed in-memory database 3300 shown in FIG. 3, for sample data from the added data portion, a constituent data-query, which may be used to query the data source for constituent data from the added data portion, or both.

An index manager may be instantiated, or otherwise operated, at 9020. For example, the index configuration data may describe or define an index and the indexing coordination unit may instantiate, or operate, an index manager for the index. The index configuration data may describe or define multiple indexes and the indexing coordination unit may instantiate, or operate, respective index managers on a per-index basis. The index manager for a respective index may obtain the index configuration data, the ontological data, or both corresponding to the respective index, such as from the indexing coordination unit.

Constituent data for generating the index may be pinned at 9030. For example, the index manager for the index may identify a data source for the index based on the index configuration data for the index, such as by reading data source identification information from the index configuration data, and the index manager may send, transmit, or otherwise make available, a request to pin the constituent data for the index to the respective data source, such as to the distributed in-memory database 3300 shown in FIG. 3. The data source may pin the constituent data in response to the request. Pinning data at 9030 may correspond with the pinning state 8110 shown in FIG. 8 and may be similar to the pinning described with respect thereto, except as described herein or otherwise clear from context.

Sample data for the index may be obtained at 9040. For example, the index manager may generate or obtain one or more sampling data-queries for the index. A sampling data-query, or sample data-query, may be used to query the constituent data for sample data. The index manager, may send, transmit, or otherwise make available, one or more requests, such as sampling data requests indicating the sampling data-queries, to the data source. The data source may execute the respective sampling data-queries, generate response data, such as sampling data (or sampling results), and may store the response data in a distinct indexing-optimized data-structure, distinct from the data source (e.g., distinct from the distributed in-memory database 3300 shown in FIG. 3), such as in a distributed file system. Obtaining sample data at 9040 may correspond with the sampling state 8120 shown in FIG. 8 and may be similar to the sampling described with respect thereto, except as described herein or otherwise clear from context.

One or more indexing assignments may be obtained at 9050. For example, the index manager may generate and send one or more segmentation assignment requests (or indexing assignment requests) for the index to a segmentation assigner. Obtaining indexing assignments at 9050, determining index segmentation at 9060, instantiating the segment manager at 9070, determining indexing modes at 9080, generating shard specifications at 9090, obtaining constituent data at 9100, determining shard assignments at 9110, building shards at 9120, or a combination thereof, may correspond with the assignment state 8130 shown in FIG. 8 and may be similar to the segmentation assignment described with respect thereto, except as described herein or otherwise clear from context.

Index segmentation may be determined at 9060. For example, the segmentation assigner may identify a segmentation strategy for the index and may instantiate one or more segment partitioners, such as the source partitioner 6210 shown in FIG. 6, the size partitioner 7210, 7310 shown in FIG. 7, or the hash partitioner 7230, 7330 shown in FIG. 7, based on the segmentation strategy. The segmentation partitioners may identify partitioning data for the index, such as on a per-object (or per-table) basis. For example, the partitioning data may associate a table with an index partition. The segmentation partitioners may identify segmentation data for the index, such as on a per-object (or per-table) basis. For example, the segmentation data may associate a table with an index segment.

One or more segment managers may be instantiated, or operated, at 9070. For example, the index manager for the index may instantiate, or operate, segment managers on a per-segment basis based on the segmentation determined at 9060.

Indexing modes may be determined at 9080. For example, the segment manager for an index segment may determine indexing modes for indexing the objects (e.g., tables or columns) of the index segment.

A first indexing mode (indexing mode 0) may indicate that an object, such as a column or token, may be omitted from indexing.

A second indexing mode (indexing mode 1) may indicate that an object, such as a column or token, may be indexed for prefix searching. Prefix searching may include searching, or obtaining tokens from, an index based on a character or symbol, or an ordered sequence of characters or symbols, at the beginning of the indexed token. Prefix searching may omit identifying an indexed token including the character or symbol, or the ordered sequence of characters or symbols, other than at the beginning of the indexed token and may omit identifying tokens omitting the character or symbol, or the ordered sequence of characters or symbols.

A third indexing mode (indexing mode 2) may indicate that an object, such as a column or token, may be indexed for word-prefix searching. Word-prefix searching may include searching, or obtaining tokens from, an index based on a character or symbol, or an ordered sequence of characters or symbols, beginning at the beginning of a discrete word in the indexed token, such as for multi-word tokens. The beginning of words in a multi-word token other than the beginning of the multi-word token may be identified based on word boundary identification, such as based on whitespace in the token. Word prefix searching may omit identifying an indexed token including the character or symbol, or the ordered sequence of characters or symbols, other than beginning at the beginning of a discrete word in the indexed token and may omit identifying tokens omitting the character or symbol, or the ordered sequence of characters or symbols. The resource utilization, such as memory utilization, for indexing an object in accordance with the third indexing mode may exceed the resource utilization for indexing an object in accordance with the second indexing mode.

A fourth indexing mode (indexing mode 3) may indicate that an object, such as a column or token, may be indexed for prefix searching and substring searching. Substring searching may include searching, or obtaining tokens from, an index based on a character or symbol, or an ordered sequence of characters or symbols other than at the beginning of the multi-word token. The resource utilization, such as memory utilization, for indexing an object in accordance with the fourth indexing mode may exceed the resource utilization for indexing an object in accordance with the third indexing mode.

For example, the segment manager for the index segment may obtain, such as read, the sample data obtained at 9040, such as by reading or otherwise accessing the sample data, or a portion thereof corresponding to the index segment, from the corresponding distinct indexing-optimized data-structure stored at 9040 in the distributed file system. The segment manager for the index segment may determine indexing modes, such as on a per-object, such as per-column, basis based on the sample data. In some implementations, the segment manager may obtain configuration data associating one or more objects with a respective indexing mode and may identify the indexing mode for the one or more objects in accordance with the configuration data.

One or more shard specifications may be generated at 9090. A shard specification may include a description of an index shard such that an indexing operation unit may generate, build, or load the index shard based on the shard specification. For example, a shard specification may include token type information, token stream information, range partitioning information, segment information, current (active) version information, target version information, or a combination thereof. The shard specification may include data indicating the respective indexing modes for objects included in the respective shard. The segment manager for an index segment may generate one or more shard specifications for the index segment. Generating the shard specifications may include sharding the index segment, such as in accordance with the sharding described with respect to FIG. 5, FIG. 6, or FIG. 7.

Constituent data may be obtained at 9100. For example, the segment manager for an index segment may generate or obtain one or more constituent data-queries for the index segment. A constituent data-query may be used to query the data source for data, such as indexable data, such as unique indexable tokens, from the constituent data corresponding to the index segment. The segment manager, may send, transmit, or otherwise make available, one or more requests, such as constituent data requests indicating the constituent data-queries, to the data source. The data source may execute the respective constituent data-queries, generate response data, such as constituent data, and may store the response data in a distinct indexing-optimized data-structure, distinct from the data source (e.g., distinct from the distributed in-memory database 3300 shown in FIG. 3), such as in the distributed file system. In some implementations, such as in response to one or more identified updates, modifications, or changes of the constituent data and the constituent data-queries may indicate the added or modified data portions.

Shard assignments may be determined at 9110. For example, the segment manager may send, transmit, or otherwise make available, the shard specifications to a shard manager, such as the shard manager described with respect to FIG. 4. A scheduler, such as the scheduler described with respect to FIG. 4, may determine index bindings. An index binding may associate an index shard with a corresponding index operation unit. The scheduler may send, transmit, or otherwise make available, data indicating the index bindings to the shard manager. The shard manager may send, transmit, or otherwise make available, shard assignments indicating the corresponding the shard specifications to the index operation units in accordance with the index bindings. The shard assignments may be generated based on, for example, the status, such as availability, of the indexing operation units, the index configuration information, data source update information, or a combination thereof. Other information may be used for generating the shard assignments.

The index shards may be generated, built, or loaded at 9120. The index operation unit bound, or assigned, to an index shard may generate the index shard based on the corresponding shard specification, which may include reading or otherwise accessing, the constituent data corresponding to the index shard from the corresponding distinct indexing-optimized data-structure stored at 9100 in the distributed file system. Generating a respective index shard may include identifying respective tokens (source tokenization) from the constituent data and storing the respective tokens in the index data structure.

Figure 10:
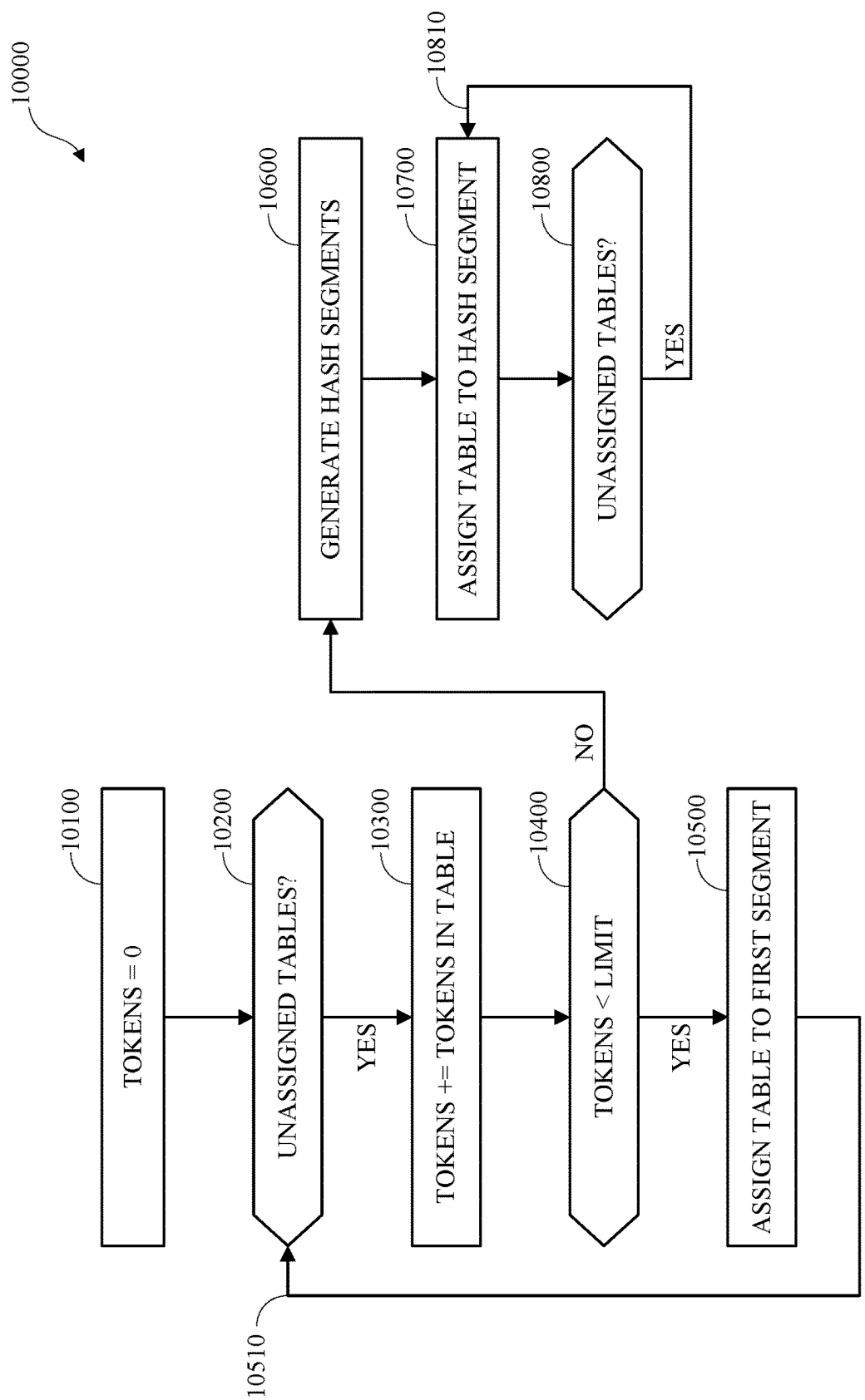
FIG. 10 is a flow diagram of an example of build-optimized-segmentation indexing in a low-latency database analysis system.

FIG. 10 is a flow diagram of an example of build-optimized-segmentation indexing 10000 in a low-latency database analysis system. Build-optimized-segmentation indexing 10000, such as generating or regenerating an index, in a low-latency database analysis system, such as the low-latency database analysis system 3000 shown in FIG. 3, may include indexing, or reindexing, the corresponding constituent data, in accordance with a multi-tiered index segmentation and sharding scheme with dynamic-partitioning, auxiliary indexing, and periodic compaction, such as the multi-tiered index segmentation and sharding scheme 7000 with dynamic-partitioning, auxiliary indexing, and periodic compaction shown in FIG. 7. For example, build-optimized-segmentation indexing 10000 may be implemented by an indexing unit, such as the relational search unit 3700 shown in FIG. 3, or the indexing unit 4000 shown in FIG. 4, which may include implementing the indexing finite state machine 8000 shown in FIG. 8. For example, determining index segmentation at 9060 as shown in FIG. 9 may include build-optimized-segmentation indexing 10000.

Build-optimized-segmentation indexing 10000 may include maintaining a counter of tokens assigned to a first segment, such as the first segment 7220 (LEVEL-0) shown in FIG. 7. Prior to assigning tables to the first segment, the counter of tokens assigned to a first segment may have a value of zero (0), as indicated at 10100.

Build-optimized-segmentation indexing 10000 may include identifying a set of tables (or objects) for partitioning and segmenting a defined set of constituent data. For example, the set of tables may be identified based on index configuration data, such as described with respect to FIG. 9. Some aspects of indexing, such as shown in FIG. 9, are omitted from FIG. 10 for simplicity.

Build-optimized-segmentation indexing 10000 may include determining whether a table (or object) from the set of tables is unassigned, or unallocated, to a segment at 10200. In response to a determination that the set of tables omits an unassigned, or unallocated, table, build-optimized-segmentation indexing 10000 may output information indicating that the table assignments for indexing the constituent data are available (not expressly shown).

In response to a determination that the set of tables includes an unassigned, or unallocated, table (the current table), build-optimized-segmentation indexing 10000 may increment the token counter for the first segment by the cardinality of tokens in the current table as indicated at 10300.

Build-optimized-segmentation indexing 10000 may include determining whether the token counter for the first segment is within, such as less than, a defined token cardinality threshold or limit for the first segment, such as one million tokens as indicated at 10400.

In response to a determination that the token counter for the first segment is within, such as less than, the defined token cardinality threshold or limit for the first segment, build-optimized-segmentation indexing 10000 may include assigning or allocating the current table to the first segment as indicated at 10500. Identifying unassigned tables at 10200, incrementing the token counter at 10300, determining whether the token counter is within the defined token cardinality threshold or limit for the first segment at 10400, assigning the current table at 10500, or a combination thereof may be repeated for other unassigned tables as indicated by the directional line at 10510.

In response to a determination that the token counter for the first segment exceeds, such as is equal to or greater than, the defined token cardinality threshold or limit for the first segment, build-optimized-segmentation indexing 10000 may include generating, at 10600, one or more second segments, such as the segments 7240-7250 (LEVEL-1 segments) shown in FIG. 7, which may be referred to herein as hash segments for simplicity. For example, the cardinality of hash segments (H) generated may be determined based on a cardinality of tokens in the constituent data (T), the defined token cardinality threshold or limit for the first segment (L0), and a defined token cardinality threshold or limit for the respective hash segments (L1), such as ten million, such as by using, as the cardinality of hash segments, a quotient, or quotient plus one for a non-zero remainder, of dividing a difference of subtracting the defined token cardinality threshold or limit for the first segment from the cardinality of tokens in the constituent data by the defined token cardinality threshold or limit for the respective hash segments, which may be expressed as $H=(T-L0)/L1$.

Build-optimized-segmentation indexing 10000 may include assigning or allocating the current table to a hash segment as indicated at 10700. Assigning or allocating the current table to a hash segment may include determining the hash segment using a hash, such as a consistent hash, on an identifier, such as a unique identifier, of the table (Table ID).

Build-optimized-segmentation indexing 10000 may include determining whether a table (or object) from the set of tables is unassigned, or unallocated, to a segment at 10800. In response to a determination that the set of tables omits an unassigned, or unallocated, table, build-optimized-segmentation indexing 10000 may output information indicating that the table assignments for indexing the constituent data are available (not expressly shown).

In response to a determination that the set of tables includes an unassigned, or unallocated, table, hash segment assignment at 10700 and identifying unassigned tables at 10800 may be repeated for other unassigned tables as indicated by the directional line at 10810.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "determine," "identify," "obtain," and "form" or any variations thereof, includes selecting, ascertaining, computing, looking up, receiving, determining, establishing, obtaining, or otherwise identifying or determining in any manner whatsoever using one or more of the devices and methods shown and described herein.

As used herein, the term "computing device" includes any unit, or combination of units, capable of performing any method, or any portion or portions thereof, disclosed herein.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more computer readable mediums having computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Attributes may comprise any data characteristic, category, content, etc. that in one example may be non-quantifiable or non-numeric. Measures may comprise quantifiable numeric values such as sizes, amounts, degrees, etc. For example, a first column containing the names of states may be considered an attribute column and a second column containing the numbers of orders received for the different states may be considered a measure column.

Aspects of the present embodiments are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a computer, such as a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
obtaining constituent data;
in response to a determination that a previously generated index portion representing the constituent data is unavailable in a primary index of a low-latency database analysis system, generating, by an indexing unit of the low-latency database analysis system, an index portion representing the constituent data in an auxiliary index, wherein generating the index portion representing the constituent data in the auxiliary index includes:
partitioning the constituent data based on a characteristic of the constituent data into at least a first partition and a second partition;
segmenting the first partition into a first segment of the first partition;
sharding the first segment of the first partition into a first shard of the first segment of the first partition;
segmenting, using hash-partitioning, the second partition into one or more segments of the second partition; and
for each segment of the second partition, sharding the segment into one or more respective shards;
in response to a determination that the previously generated index portion representing the constituent data is available in the primary index, indexing, by the indexing unit, the constituent data in the primary index, wherein indexing the constituent data in the primary index includes:
partitioning the constituent data based on the characteristic of the constituent data into at least a first partition and a second partition;
segmenting the first partition into a first segment of the first partition;
sharding the first segment of the first partition into a first shard of the first segment of the first partition;
segmenting, using hash-partitioning, the second partition into one or more segments of the second partition; and
for each segment of the second partition, sharding the segment into one or more respective shards; and
in response to a defined event, compacting the auxiliary index into the primary index.

2. The method of claim 1, wherein indexing the constituent data includes:
receiving, at the indexing unit, information indicating a change of at least a portion of the constituent data; and
identifying the constituent data in response to receiving the information indicating the change.

3. The method of claim 1, wherein indexing the constituent data includes:
sending, from the indexing unit to a database unit, a request to pin a portion of a database corresponding to the constituent data;
in response to receiving, by the indexing unit, an indication that the portion of the database is pinned, sending, from the indexing unit to the database unit, a sampling data request indicating a sampling data-query for the portion of the database; and
accessing, by the indexing unit, sampling results responsive to the sampling data-query.

4. The method of claim 3, wherein indexing the constituent data includes:
in response to accessing, by the indexing unit, the sampling results, sending, from the indexing unit to a segmentation assigner, a segmentation assignment request; and
in response to obtaining, by the indexing unit, a segmentation assignment, partitioning the constituent data in accordance with the segmentation assignment.

5. The method of claim 3, wherein indexing the constituent data includes obtaining information representing the constituent data as a plurality of logical tables.

6. The method of claim 5, wherein partitioning the constituent data includes:
identifying a smallest unpartitioned table from the plurality of logical tables;
in response to a determination that a current size of the first partition is less than a defined maximum size for the first partition:
identifying a sum of the current size of the first partition and a size of the smallest unpartitioned table as the current size of the first partition; and
assigning the smallest unpartitioned table to the first partition;
in response to a determination that the current size of the first partition is at least the defined maximum size for the first partition, assigning the smallest unpartitioned table to the second partition; and
identifying the smallest unpartitioned table as a partitioned table.

7. The method of claim 5, wherein segmenting, using hash-partitioning, the second partition includes:
identifying, as a cardinality of the one or more segments of the second partition, the lesser of a defined maximum cardinality of segments of the second partition or a quotient of dividing a sum of the sizes of the tables from the plurality of logical tables assigned to the second partition by a defined maximum segment size.

8. The method of claim 3, wherein, for a respective segment, sharding includes:
identifying, by a segment manager of the indexing unit, an indexing mode for indexing an object from the respective segment based on the sampling results;
generating, by the segment manager, a shard specification for generating a shard of the respective segment based on the sampling results and the indexing mode;
sending, from the indexing unit to the database unit, a constituent data request indicating a constituent data-query for the respective segment;
generating a shard assignment indicating the shard specification and an indexing operation unit; and
generating, by the indexing operation unit, the shard based on the shard assignment, wherein generating the shard includes accessing the constituent data responsive to the constituent data request.

9. The method of claim 1, further comprising:
receiving data expressing a usage intent with respect to the low-latency database analysis system;
in response to receiving the data expressing the usage intent, generating response data responsive to the data expressing the usage intent, wherein generating the response data includes:
generating a resolved-request representing the data expressing the usage intent by resolving at least a portion of the data expressing the usage intent by traversing a unified index, wherein the unified index includes the primary index and the auxiliary index;

generating a data-query representing the resolved-request; and sending the data-query to a database for execution to obtain the response data; and outputting the response data.

10. The method of claim 9, wherein traversing the unified index includes:

traversing a shard from the primary index to identify a token corresponding to a portion of the data expressing the usage intent.

11. The method of claim 9, wherein traversing the unified index includes:

traversing a shard from the auxiliary index to identify a token corresponding to a portion of the data expressing the usage intent.

12. A method comprising:

obtaining index configuration data for indexing constituent data, the constituent data including a plurality of logical tables; and indexing in an index, by an indexing unit, the constituent data by:

partitioning the constituent data based on a characteristic of the constituent data into at least a first partition and a second partition, wherein partitioning the constituent data includes:

identifying a smallest unpartitioned table from the plurality of logical tables:

in response to a determination that a current size of the first partition is less than a defined maximum size for the first partition:

identifying a sum of the current size of the first partition and a size of the smallest unpartitioned table as the current size of the first partition; and assigning the smallest unpartitioned table to the first partition;

in response to a determination that the current size of the first partition is at least the defined maximum size for the first partition, assigning the smallest unpartitioned table to the second partition; and identifying the smallest unpartitioned table as a partitioned table;

segmenting the first partition into a first segment of the first partition;

sharding the first segment into a first shard of the first segment of the first partition;

segmenting, using hash-partitioning, the second partition into one or more segments of the second partition; and for each segment of the second partition, sharding the segment into one or more respective shards, wherein indexing the constituent data includes:

sending, from the indexing unit to a database unit, a request to pin a portion of a database corresponding to the constituent data;

in response to receiving, by the indexing unit, an indication that the portion of the database is pinned, sending, from the indexing unit to the database unit, a sampling data request indicating a sampling data-query for the portion of the database; and accessing, by the indexing unit, sampling results responsive to the sampling data-query.

13. The method of claim 12, wherein segmenting, using hash-partitioning, the second partition includes:

identifying, as a cardinality of the one or more segments of the second partition, the lesser of a defined maximum cardinality of segments of the second partition or a quotient of dividing a sum of the sizes of the tables from the plurality of logical tables assigned to the second partition by a defined maximum segment size.

14. The method of claim 12, wherein, for a respective segment, sharding includes:

identifying, by a segment manager of the indexing unit, an indexing mode for indexing an object from the respective segment based on the sampling results;

generating, by the segment manager, a shard specification for generating a shard of the respective segment based on the sampling results and the indexing mode;

sending, from the indexing unit to the database unit, a constituent data request indicating a constituent data-query for the respective segment;

generating a shard assignment indicating the shard specification and an indexing operation unit; and generating, by the indexing operation unit, the shard based on the shard assignment, wherein generating the shard includes accessing the constituent data responsive to the constituent data request.

15. The method of claim 12, further comprising:

receiving data expressing a usage intent with respect to the constituent data;

in response to receiving the data expressing the usage intent, generating response data responsive to the data expressing the usage intent, wherein generating the response data includes resolving at least a portion of the data expressing the usage intent by traversing the index, wherein traversing the index includes traversing a shard from the index to identify a token corresponding to a portion of the data expressing the usage intent; and outputting the response data.

16. A low-latency database analysis system comprising:

a system access interface unit operable to generate data expressing a usage intent with respect to a defined set of constituent data;

a distributed in-memory database operable to store the constituent data;

an indexing unit operable to index the constituent data in an index by:

sending, to the distributed in-memory database, a request to pin the constituent data;

in response to receiving an indication that the constituent data is pinned, sending, to the distributed in-memory database, a sampling data request indicating a sampling data-query for the constituent data, wherein the distributed in-memory database is configured to output sampling results responsive to the sampling data-query;

partitioning the constituent data based on a characteristic of the constituent data into at least a first partition and a second partition, wherein partitioning includes:

identifying a smallest unpartitioned table from the plurality of logical tables based on the sampling results;

in response to a determination that a current size of the first partition is less than a defined maximum size for the first partition:

identifying a sum of the current size of the first partition and a size of the smallest unpartitioned table as the current size of the first partition; and assigning the smallest unpartitioned table to the first partition;

in response to a determination that the current size of the first partition is at least the defined maximum size for the first partition, assigning the smallest unpartitioned table to the second partition; and identifying the smallest unpartitioned table as a partitioned table;

segmenting the first partition into a first segment of the first partition;

sharding the first segment into a first shard of the first segment of the first partition;

segmenting, using hash-partitioning, the second partition into one or more segments of the second partition; and for each segment of the second partition, sharding the segment into one or more respective shards;

wherein the indexing unit is operable to output, to the system access interface unit, response data responsive to the data expressing the usage intent by, in response to receiving the data expressing the usage intent, generating the response data, wherein generating the response data includes resolving at least a portion of the data expressing the usage intent by traversing the index, wherein traversing the index includes traversing a shard from the index to identify a token corresponding to a portion of the data expressing the usage intent.

17. The low-latency database analysis system of claim 16, wherein the indexing unit is operable to shard a respective segment by:

identifying, by a segment manager of the indexing unit, an indexing mode for indexing an object from the respective segment based on the sampling results;

generating, by the segment manager, a shard specification for generating a shard of the respective segment based on the sampling results and the indexing mode;

sending, to the distributed in-memory database, a constituent data request indicating a constituent data-query for the respective segment, wherein the distributed in-memory database is configured to output constituent data results responsive to the constituent data-query;

generating a shard assignment indicating the shard specification and an indexing operation unit of the indexing unit; and generating, by the indexing operation unit, the shard based on the shard assignment, wherein generating the shard includes accessing constituent data results responsive to the constituent data request.

* * * * *